United States Patent
Egami et al.

(10) Patent No.: US 10,097,069 B2
(45) Date of Patent: Oct. 9, 2018

(54) ELECTRICAL COLLECTING AND DISTRIBUTING MEMBER HOLDING STRUCTURE, ELECTRIC MOTOR, AND ELECTRIC MOTOR PRODUCING METHOD

(71) Applicants: Hitachi Metals, Ltd., Tokyo (JP); Honda Motor Co., Ltd., Tokyo (JP)

(72) Inventors: Kenichi Egami, Kitaibaraki (JP); Hidenori Okada, Wako (JP); Manabu Yazaki, Wako (JP); Koichi Ono, Wako (JP)

(73) Assignees: HITACHI METALS, LTD., Tokyo (JP); HONDA MOTOR CO., LTD., Tokyo (JP)

( * ) Notice: Subject to any disclaimer, the term of this patent is extended or adjusted under 35 U.S.C. 154(b) by 714 days.

(21) Appl. No.: 14/468,385

(22) Filed: Aug. 26, 2014

(65) Prior Publication Data

US 2015/0061430 A1 Mar. 5, 2015

(30) Foreign Application Priority Data

Aug. 27, 2013 (JP) ................................ 2013-175265

(51) Int. Cl.
| | | |
|---|---|---|
| *H02K 3/28* | (2006.01) | |
| *H02K 15/00* | (2006.01) | |
| *H02K 3/52* | (2006.01) | |

(52) U.S. Cl.
CPC ......... *H02K 15/0056* (2013.01); *H02K 3/522* (2013.01); *Y10T 29/49009* (2015.01)

(58) Field of Classification Search
CPC ..... H02K 3/522; H02K 15/0056; H02K 5/225
(Continued)

(56) References Cited

U.S. PATENT DOCUMENTS 5,777,410 A * 7/1998 Asakura ............. B60H 1/00835
                                                                                310/69
7,476,995 B2 * 1/2009 Uchiyama .............. H02K 3/505
                                                                         310/179
(Continued)

FOREIGN PATENT DOCUMENTS

| JP | 2002034212 A | 1/2002 |
|---|---|---|
| JP | 2003324887 A | 11/2003 |

(Continued)

OTHER PUBLICATIONS

JPO machine translation of Genda T et al. (JP 5978357 B2).*
(Continued)

*Primary Examiner* — Naishadh Desai

(57) ABSTRACT

An electrical collecting and distributing member holding structure is composed of a stator including a multiplicity of cores arranged annularly, windings wound around the multiplicity of cores respectively, and an insulator for electrical insulation between the cores and the windings, a plurality of annular electrical collecting and distributing members held around the stator to collect and distribute electric current to the windings, and a holding portion formed on the insulator. The holding portion includes a plurality of recesses formed therein. The plurality of electrical collecting and distributing members are being held in the holding portion in such a manner as to be partially received in the plurality of recesses, respectively.

11 Claims, 14 Drawing Sheets

331a FIRST RECESS
331b SECOND RECESS
332 ELECTRICALLY INSULATING PORTION
334 INNER WALL

(58) Field of Classification Search
USPC .......................................................... 310/71
See application file for complete search history.

(56) References Cited

U.S. PATENT DOCUMENTS

| | | | | |
|---|---|---|---|---|
| 7,952,245 | B2* | 5/2011 | Ueda ..................... | H02K 3/522 |
| | | | | 310/66 |
| 8,154,163 | B2 | 4/2012 | Inoue et al. | |
| 9,419,487 | B2* | 8/2016 | Yazaki ................... | H02K 3/522 |
| 2007/0080592 | A1* | 4/2007 | Ohta ....................... | H02K 1/148 |
| | | | | 310/71 |
| 2007/0232094 | A1* | 10/2007 | Hoshika ................. | H02K 3/522 |
| | | | | 439/76.2 |
| 2009/0256439 | A1* | 10/2009 | Inoue ..................... | H02K 3/522 |
| | | | | 310/71 |
| 2012/0319512 | A1* | 12/2012 | Nakagawa ............. | H02K 1/278 |
| | | | | 310/71 |
| 2014/0246934 | A1 | 9/2014 | Egami et al. | |
| 2014/0292124 | A1* | 10/2014 | Nakamura ........... | H02K 15/026 |
| | | | | 310/71 |

FOREIGN PATENT DOCUMENTS

| | | |
|---|---|---|
| JP | 2005229677 A | 8/2005 |
| JP | 2007-174869 A | 7/2007 |
| JP | 2007267569 A | 10/2007 |
| JP | 2009-261082 A | 11/2009 |
| JP | 2009261094 A | 11/2009 |
| JP | 5978357 B2 * | 8/2016 |
| WO | 2012141135 A1 | 10/2012 |

OTHER PUBLICATIONS

Japanese Office Action for corresponding Japanese Patent Application No. 2013-175265 dated Jul. 26, 2016 and English translation thereof.
Office Action issued in the corresponding Chinese Patent Application No. 201410429298.8 dated Nov. 16, 2017.

* cited by examiner

4 ELECTRICAL COLLECTING AND DISTRIBUTING RING

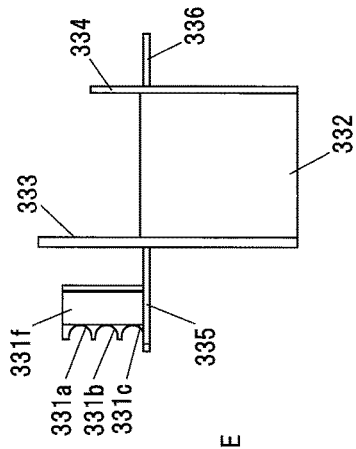
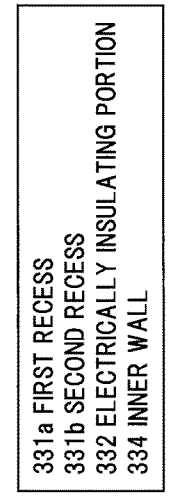
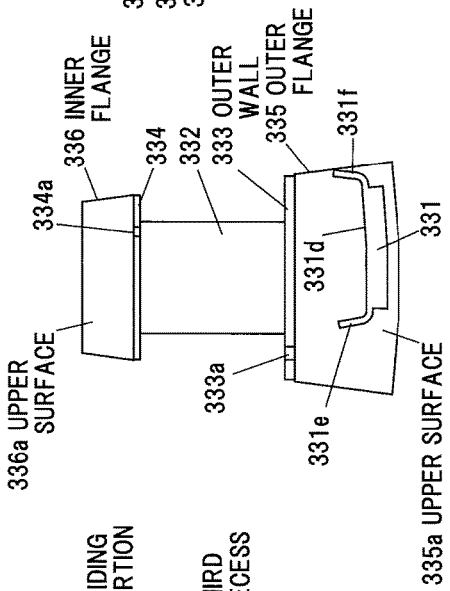
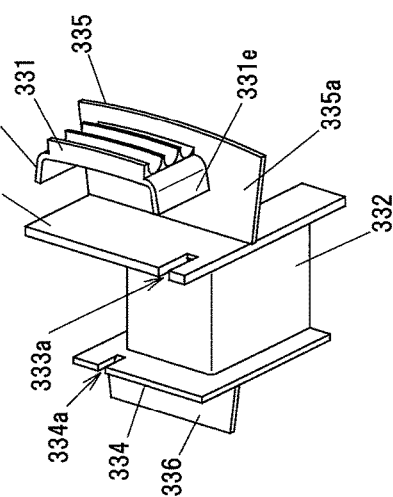
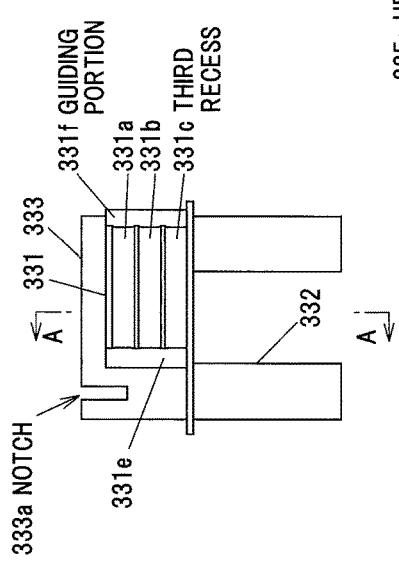
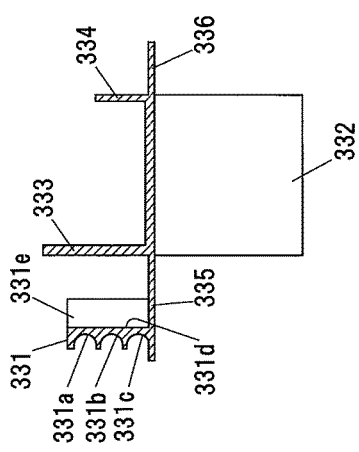

ELECTRICAL COLLECTING AND DISTRIBUTING MEMBER HOLDING STRUCTURE, ELECTRIC MOTOR, AND ELECTRIC MOTOR PRODUCING METHOD

The present application is based on Japanese patent application No. 2013-175265 filed on Aug. 27, 2013, the entire contents of which are incorporated herein by reference.

BACKGROUND OF THE INVENTION

1. Field of the Invention

This invention relates to a holding structure for electrical collecting and distributing members to collect and distribute electric current to windings, an electric motor and an electric motor producing method.

2. Description of the Related Art

In the past, an electric motor has been suggested that includes multiple phase windings wound around annularly arranged multiple cores respectively, an insulator made of an electrically insulating member interposed between the cores and the windings for electrical insulation therebetween, and annular electrical collecting and distributing members arranged coaxially with the multiple cores to collect and distribute electric current to the multiple phase windings (See e.g., JP-A-2009-261082).

The electrical collecting and distributing ring in the motor described in JP-A-2009-261082 includes bus rings as the plurality of coaxially arranged electrical collecting and distributing members, and a plurality of fixing members, which fix the plurality of bus rings together. The plurality of fixing members are spaced in a circumferential direction of the plurality of bus rings in such a manner that connecting terminals connected to a respective one of the plurality of bus rings are located between the plurality of fixing members, and the plurality of fixing members are formed by molding.

The plurality of fixing members include a respective projecting portion, which projects outward from an outer surface in a radial direction, and this projecting portion is mountable into a hole provided on an outer peripheral wall of an electrically insulating bobbin. This electrically insulating bobbin is made of an electrically insulative resin material mounted around the iron cores, and serves as an insulator for electrical insulation between the iron cores and the windings.

Refer to JP-A-2009-261082 and JP-A-2007-174869, for example.

SUMMARY OF THE INVENTION

The motor described in JP-A-2009-261082 requires a mold for molding the fixing members, and also its fabrication process requires the molding which involves setting the plurality of bus rings in this mold, and injecting a resin into a cavity. This has led to an increase in production cost of the motor due to the molding of the fixing members.

Accordingly, it is an object of the present invention to provide an electrical collecting and distributing member holding structure, an electric motor, and an electric motor producing method, which allow for reducing production cost therefor.

(1) According to a first embodiment of the invention, an electrical collecting and distributing member holding structure comprises:

a stator including a multiplicity of cores arranged annularly, windings wound around the multiplicity of cores respectively, and an insulator for electrical insulation between the cores and the windings;

a plurality of annular electrical collecting and distributing members held around the stator to collect and distribute electric current to the windings; and a holding portion formed on the insulator, the holding portion including a plurality of recesses formed therein, the plurality of electrical collecting and distributing members being held in the holding portion in such a manner as to be partially received in the plurality of recesses, respectively.

In the first embodiment, the following modifications and changes can be made.

(i) The plurality of recesses are being formed on top of each other in an axial direction of the stator, and are open in a radial direction of the stator.

(ii) The plurality of electrical collecting and distributing members are being inserted by press fitting into the plurality of recesses, respectively.

(iii) The electrical collecting and distributing member holding structure further comprises a locking portion provided on the holding portion to lock the electrical collecting and distributing members to prevent the electrical collecting and distributing members from slipping out of the recesses.

(iv) The electrical collecting and distributing members integrally include a respective U shaped portion, which is formed by bending a metal conductor into a U shape, respective held portions, which are held in the holding portion, and a respective pair of extended portions, which are provided between both ends of the respective U shaped portion and the respective held portions, respectively, by extension in a radial direction of the annular electrical collecting and distributing members, wherein the electrical collecting and distributing members and the windings are electrically connected together with a respective end of the windings inserted in the respective U shaped portion.

(v) The electrical collecting and distributing members and the windings are electrically connected together by caulking the respective U shaped portion with the respective end of the windings inserted therein.

(vi) The respective U shaped portion is plated with tin, and the electrical collecting and distributing members and the windings are electrically connected together by heat caulking the respective U shaped portion with the respective end of the windings inserted therein.

(vii) The respective pair of extended portions are not in contact with each other with the respective U shaped portion electrically connected to the respective end of the windings.

(viii) A plurality of the holding portions are arranged on the stator and spaced in a circumferential direction of the stator, and the electrical collecting and distributing members are arranged in such a manner that their respective pairs of extended portions project from between pairs of the adjacent holding portions in the circumferential direction of the stator, and in inserting directions of the respective held portions into the recesses of the pairs of the adjacent holding portions, respectively.

(ix) A pitch between the pairs of the adjacent holding portions in the circumferential direction of the stator accommodates a width of the respective pairs of extended portions in circumferential directions of the electrical collecting and distributing members.

(x) The plurality of electrical collecting and distributing members are in identical shapes.

(xi) At least some of the plurality of windings are bent depending on locations of the plurality of electrical collecting and distributing members, respectively, in an axial direction of the stator.

(xii) The plurality of recesses are being formed side by side in a radial direction of the stator, and are open in an axial direction of the stator.

(2) According to a second embodiment of the invention, an electric motor comprises:

a stator including a multiplicity of cores arranged annularly, U, V, and W phase windings wound around the multiplicity of cores respectively, and an insulator for electrical insulation between the cores and the U, V, and W phase windings;

a first annular electrical collecting and distributing member to collect and distribute electric current to the U phase winding;

a second annular electrical collecting and distributing member to collect and distribute electric current to the V phase winding;

a third annular electrical collecting and distributing member to collect and distribute electric current to the W phase winding; and a holding portion formed on the insulator, the holding portion including a plurality of recesses formed therein, the first, second, and third electrical collecting and distributing members being partially received in the plurality of recesses, respectively, and held in the holding portion.

(3) According to a third embodiment of the invention, a method for producing the electric motor as specified in (2) above comprises:

holding the first, second, and third electrical collecting and distributing members in the holding portion; and connecting together the U, V, and W phase windings and the first, second, and third electrical collecting and distributing members, respectively.

In the third embodiment, the following modifications and changes can be made.

(i) The electric motor producing method further comprises bending at least some of the U, V, and W phase windings depending on locations of the first, second, and third electrical collecting and distributing members, respectively, in the axial direction of the stator, and aligning the U, V, and W phase windings with connecting portions of the first, second, and third electrical collecting and distributing members, respectively.

(ii) The electric motor producing method further comprises forming the first, second, and third electrical collecting and distributing members of the electric motor from linear conductors into ring shapes respectively, and in the holding step, partially receiving the first, second, and third electrical collecting and distributing members in the plurality of recesses, respectively, and subsequently connecting both respective ends of the linear conductors to one terminal.

Points of the Invention

The present invention allows for holding the electrical collecting and distributing members directly in the insulator and thereby reducing its production cost.

BRIEF DESCRIPTION OF THE DRAWINGS

The preferred embodiments according to the invention will be explained below referring to the drawings, wherein:

FIG. 5A is a front view showing an insulator;

FIG. 5B is a plan view showing that insulator;

FIG. 5C is a side view showing that insulator;

FIG. 5D is a cross sectional view along A-A line in FIG. 5A showing that insulator;

FIG. 5E is a perspective view showing that insulator;

DETAILED DESCRIPTION OF THE PREFERRED EMBODIMENTS

First Embodiment (Entire Electric Motor Configuration)

Figure 1:
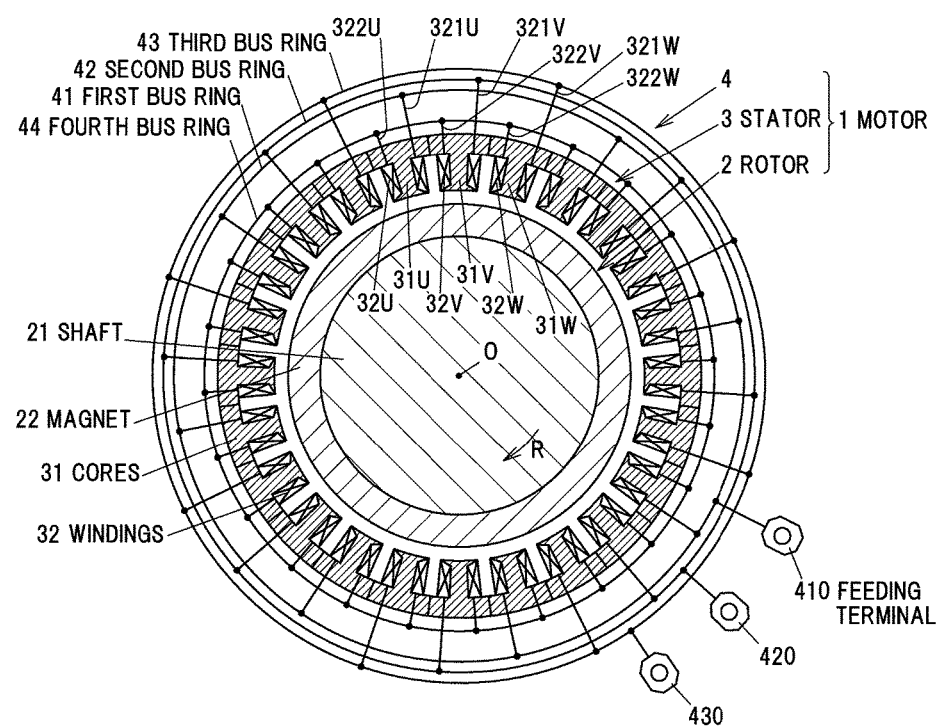
FIG. 1 is a schematic diagram showing a configuration example of an electric motor with an electrical collecting and distributing ring in a first embodiment according to the present invention.

FIG. 1 is a schematic diagram showing a configuration example of an electric motor 1 with an electrical collecting and distributing ring 4 in a first embodiment according to the present invention.

This motor 1 includes a rotor 2, which is a rotating part, a stator 3, which is a stationary part, and the electrical collecting and distributing ring 4 comprising first to fourth bus rings 41 to 44 held around the stator 3.

The rotor 2 includes a shaft 21, which is supported pivotally and coaxially with the stator 3 by a bearing not shown, and a cylindrical magnet 22 having a plurality of magnetic poles, which are fixed around an outer peripheral surface of the shaft 21.

The stator 3 includes a multiplicity of cores 31 arranged annularly, outer peripheral windings 32 wound around the cores 31 respectively, and insulators 33 (shown in FIG. 2) to be described later. In this embodiment, the 24 cores 31 are arranged in a circumferential direction of the stator 3. These 24 cores 31 are classified into U phase cores 31U, V phase cores 31V and W phase cores 31W, depending on locations thereof, and, in a rotating direction R of the rotor 2 shown in FIG. 1, the V phase cores 31V are arranged next to the U phase cores 31U respectively, the W phase cores 31W are arranged next to the V phase cores 31V respectively, and the U phase cores 31U are arranged next to the W phase cores 31W respectively.

The windings 32 wound around the U phase cores 31U are U phase windings 32U, the windings 32 wound around the V phase cores 31V are V phase windings 32V, and the windings 32 wound around the W phase cores 31W are W phase windings 32W. Electrical collection and distribution to the U phase windings 32U is performed by a first bus ring 41. Electrical collection and distribution to the V phase windings 32V is performed by a second bus ring 42. Also, electrical collection and distribution to the W phase windings 32W is performed by a third bus ring 43.

Of both respective ends of the U phase windings 32U, respective one ends 321U are electrically connected to the first bus ring 41, while respective other ends 322U are electrically connected to the fourth bus ring 44. Of both respective ends of the V phase windings 32V, respective one ends 321V are electrically connected to the second bus ring 42, while respective other ends 322V are electrically connected to the fourth bus ring 44. Also, of both respective ends of the W phase windings 32W, respective one ends 321W are electrically connected to the third bus ring 43, while respective other ends 322W are electrically connected to the fourth bus ring 44.

The first bus ring 41 is given as one example of the first electrical collecting and distributing member of the present invention, and the second bus ring 42 is given as one example of the second electrical collecting and distributing member of the present invention. Also, the third bus ring 43 is given as one example of the third electrical collecting and distributing member of the present invention. The fourth bus ring 44 functions as a neutral phase bus ring.

The first, second, and third bus rings 41, 42, and 43 are connected with feeding terminals 410, 420, and 430, respectively, so that the first, second, and third bus rings 41, 42, and 43 are provided with sine wave driving currents, respectively, each being 120 degrees out of phase from the others, from the inverter not shown, through those feeding terminals 410, 420, and 430. The driving currents produce a rotating magnetic field in the stator 3. The magnet 22 is acted on by a rotational force resulting from attractive and repulsive forces due to the rotating magnetic field, and this rotational force results in a rotation about rotation axis O of the shaft 21. The first, second, and third bus rings 41, 42, and 43 are fixed to the stator 3 by a holding structure to be described later.

Figure 2:
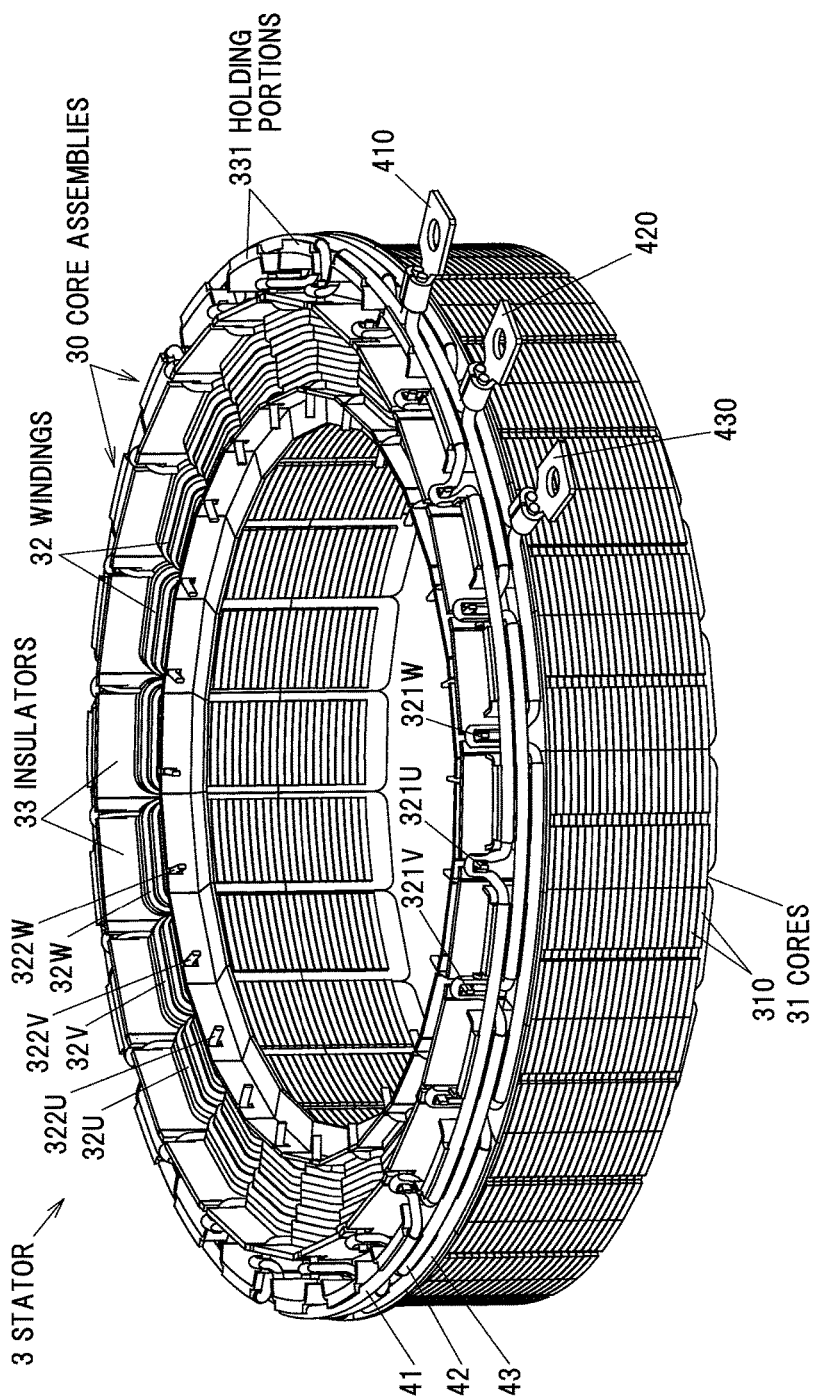
FIG. 2 is a perspective view showing a stator and first, second, and third bus rings but without showing a rotor and a fourth bus ring.
Figure 3:
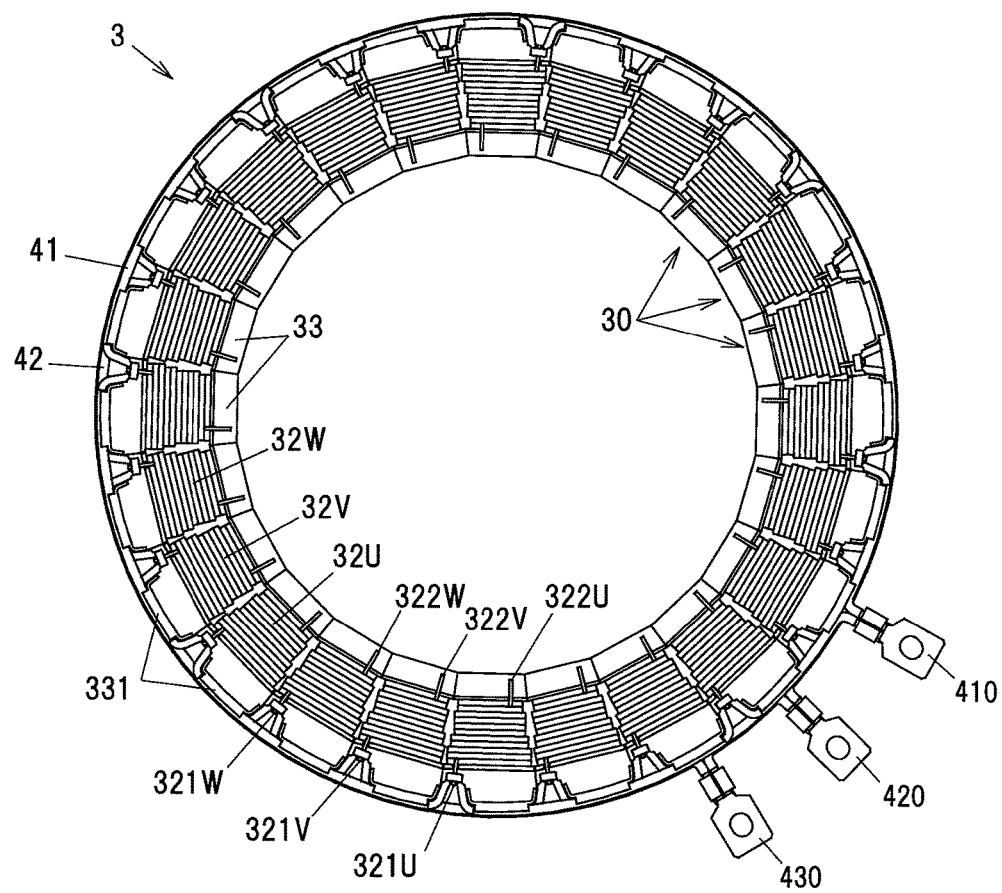
FIG. 3 is a plan view showing the stator and the first, second, and third bus rings viewed in a central axis direction thereof.
Figure 4:
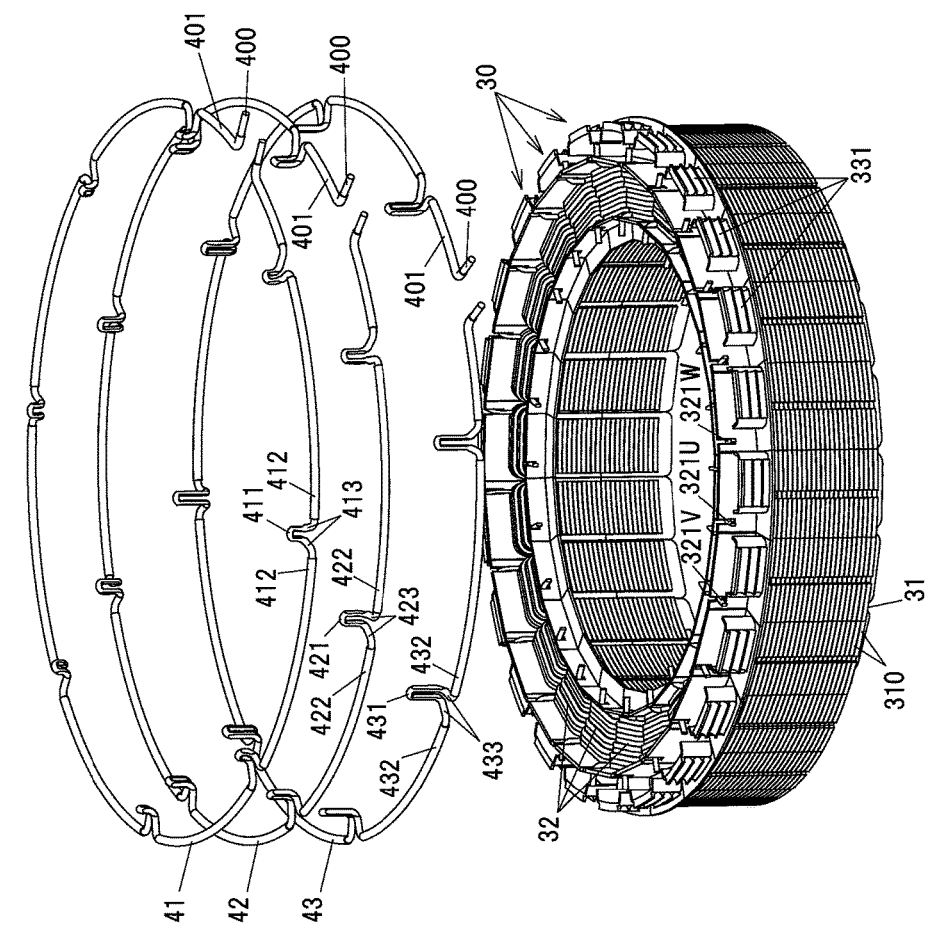
FIG. 4 is an exploded perspective view showing the first, second, and third bus rings separated from the stator.

FIG. 2 is a perspective view showing the stator 3 and the first, second, and third bus rings 41, 42, and 43 but without showing the rotor 2 and the fourth bus ring 44. FIG. 3 is a plan view showing the stator 3 and the first, second, and third bus rings 41, 42, and 43 viewed in a central axis direction thereof. FIG. 4 is an exploded perspective view showing the first, second, and third bus rings 41, 42, and 43 separated from the stator 3.

The stator 3 comprises a multiplicity of core assemblies 30 including the cores 31 comprising a multiplicity of laminated magnetic steel sheets 310, insulators 33 mounted to the cores 31 respectively, and the outer peripheral windings 32 wound around the cores 31 respectively with the insulators 33 therebetween respectively. In this embodiment, the stator 3 is formed in a ring shape by annularly arranging the 24 core assemblies 30.

The insulators 33 have holding portions 331 respectively for holding the first, second, and third bus rings 41, 42, and 43. The first, second, and third bus rings 41, 42, and 43 are arranged concentrically on top of each other in an axial direction of the stator 3, and are held in the holding portions 331. A configuration of the holding portions 331 will be described in detail later.

The holding portions 331 are provided around an outer periphery of the stator 3 relative to the windings 32 (the U phase windings 32U, the V phase windings 32V and the W phase windings 32W). The respective one ends 321U, 321V, and 321W of the windings 32 are extended outward in radial directions, respectively, of the stator 3, and are connected to the first, second, and third bus rings 41, 42, and 43, respectively. The respective other ends 322U, 322V, and 322W of the windings 32 are extended inward in radial directions, respectively, of the stator 3, and are connected to the fourth bus ring 44 (shown in FIG. 1).

The first, second, and third bus rings 41, 42, and 43 are formed by bending an insulated wire which is formed by coating a linear central conductor (metal conductor) 400 made of a metal having good electrical conductivity, such as copper, with an insulator 401 made of a resin. At both the respective ends of the first, second, and third bus rings 41, 42, and 43, their respective central conductors 400 are exposed from their respective insulators 401 respectively, so that their respective exposed central conductor 400 portions are connected by crimping to the feeding terminals 410, 420, and 430, respectively. In other words, the first, second, and third bus rings 41, 42, and 43 are formed by annularly forming their respective central conductors 400 respectively, and both the respective ends of their respective central conductors 400 are connected to one terminal (i.e., the feeding terminal 410, 420, and 430 respectively). Note that, in the present embodiment, the respective central conductors 400 are each formed of a solid wire, but the respective central conductors 400 may each be a stranded wire, which comprises a plurality of wires stranded together.

(Insulator Configuration)

FIGS. 5A, 5B, 5C, 5D, and 5E are a front view, a plan view, a side view, a cross sectional view along A-A line in FIG. 5A, and a perspective view, respectively, showing the insulator 33.

The insulator 33 is made of an insulator such as a resin or the like, and includes the holding portion 331, an electrically insulating portion 332 interposed between the cores 31 and the windings 32, an outer wall 333 and an inner wall 334 opposite each other with the electrically insulating portion 332 therebetween in a radial direction of the stator 3, an outer flange 335 projecting from the outer wall 333 outward around the stator 3 and including an upper surface 335a at right angles to the axial direction of the stator 3 and an inner flange 336 projecting from the inner wall 334 inward around the stator 3 and including an upper surface 336a at right angles to the axial direction of the stator 3.

The holding portion 331 is erected on the upper surface 335a of the outer flange 335 and in the axial direction of the stator 3, and its inner surface 331d on the inner side in the radial direction of the stator 3 is opposite the outer wall 333. A width of the holding portion 331 in the circumferential direction of the stator 3 is formed more narrowly than a width in that circumferential direction of the outer flange 335. With a mold to form the insulator 33, that holding portion 331 is formed together with the electrically insulating portion 332, the outer wall 333, the inner wall 334, the outer flange 335 and the inner flange 336.

The outer wall 333 is formed with a notch 333a for the respective one end 321U, 321V, or 321W of the windings 32 to be inserted therein. The notch 333a is formed from the outer wall 333 end in the axial direction of the stator 3 toward the upper surface 335a of the outer flange 335. Also, the notch 333a is formed in such a portion as to be not opposite the inner surface 331d of the holding portion 331.

The inner wall 334 is formed with a notch 334a extending from its end in the axial direction of the stator 3 toward the upper surface 336a of the inner flange 336 so that the respective other end 322U, 322V, or 322W of the windings 32 is inserted in the notch 334a.

The inner wall 334 is formed with a first recess 331a, a second recess 331b, and a third recess 331c on top of each other in the axial direction of the stator 3. The first recess 331a partially receives the first bus ring 41. The second recess 331b partially receives the second bus ring 42. The third recess 331c partially receives the third bus ring 43. The first, second, and third recesses 331a, 331b, and 331c are formed in such a manner as to extend in the circumferential direction of the stator 3 and are open in the radial direction of the stator 3.

In this embodiment, the first, second, and third recesses 331a, 331b, and 331c are formed in such a manner as to be hollowed inward in the radial direction of the stator 3, and are open outward in the radial direction of the stator 3. Also, bottom surfaces of the first, second, and third recesses 331a, 331b, and 331c are shaped into a circular arc fitted to a curvature of outer peripheral surfaces of the first, second, and third bus rings 41, 42, and 43 respectively.

Also, the holding portion 331 is formed with one pair of guiding portions 331e and 331f at both its ends respectively in the circumferential direction of the stator 3. The one pair of guiding portions 331e and 331f extend continuously from the bottom surfaces of the first, second, and third recesses 331a, 331b, and 331c toward the outer wall 333. More specifically, the one pair of guiding portions 331e and 331f include outer surfaces, respectively, extended continuously from the bottom surfaces of the first, second, and third recesses 331a, 331b, and 331c, gently curved and spaced wider in the circumferential direction of the stator 3 with decreasing distance to the outer wall 333.

The first bus ring 41 is held in the holding portion 331 in such a manner as to be partially held in the first recess 331a the second bus ring 42 is held in the holding portion 331 in such a manner as to be partially held in the second recess 331b. Also, the third bus ring 43 is held in the holding portion 331 in such a manner as to be partially held in the third recess 331c.

The first, second, and third bus rings 41, 42, and 43 are inserted by press fitting into the first, second, and third recesses 331a, 331b, and 331c, respectively. Here, the "press fitting" refers to pressing the first, second, and third bus rings 41, 42, and 43 toward the bottom surfaces of the first, second, and third recesses 331a, 331b, and 331c, respectively. More specifically, the "press fitting" refers to pressing with such a force that the first, second, and third bus rings 41, 42, and 43 do not easily slip out of the first, second, and third recesses 331a, 331b, and 331c respectively (e.g., due to the first, second, and third bus rings 41, 42, and 43' own weights).

(First, Second, and Third Bus Ring 41, 42, and 43 Configuration)

Figure 6A:
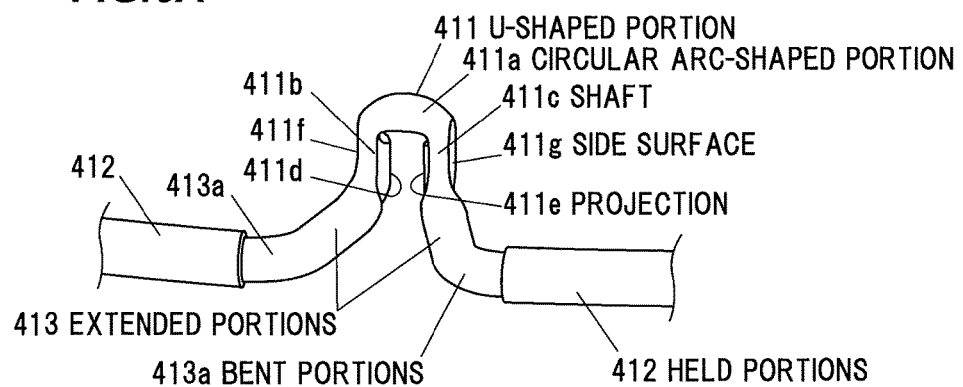
FIG. 6A is a partial enlarged view showing a first bus ring.
Figure 6B:
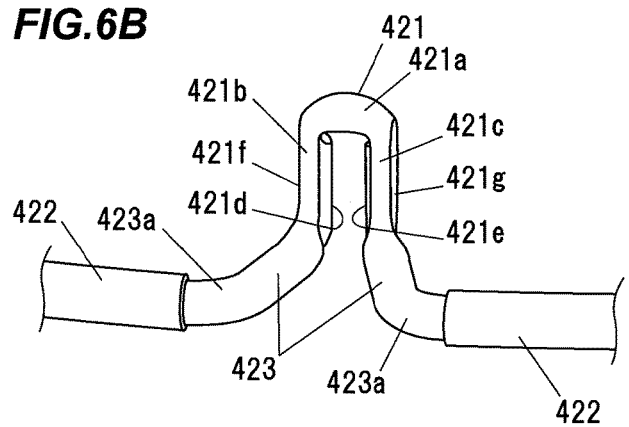
FIG. 6B is a partial enlarged view showing a second bus ring.
Figure 6C:
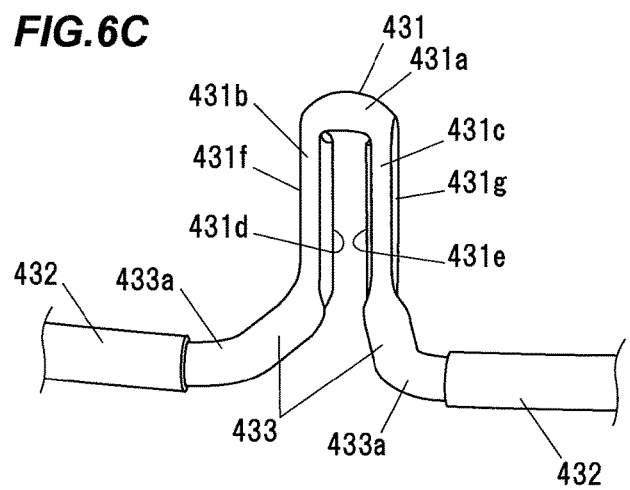
FIG. 6C is a partial enlarged view showing a third bus ring.

FIG. 6A is a partial enlarged view showing the first bus ring 41. FIG. 6B is a partial enlarged view showing the second bus ring 42. FIG. 6C is a partial enlarged view showing the third bus ring 43.

The first bus ring 41 integrally includes a U shaped portion 411 which is formed by bending the central conductor 400 into a U shape, held portions 412, which are held in the holding portion 331, and a pair of extended portions 413, which are provided between both ends of the U shaped portion 411 and the held portions 412, respectively, by extension in a radial direction of the first bus ring 41. The one pair of extended portions 413 of the first bus ring 41 are spaced apart in a circumferential direction thereof so as to allow the one end 321U of the U phase winding 32U to be inserted from the space between the one pair of extended portions 413 into the U shaped portion 411.

Likewise, the second bus ring 42 integrally includes a U shaped portion 421 which is formed by bending the central conductor 400 into a U shape, held portions 422, which are held in the holding portion 331, and a pair of extended portions 423, which are provided between both ends of the U shaped portion 421 and the held portions 422, respectively, by extension in a radial direction of the second bus ring 42. The one pair of extended portions 423 of the second bus ring 42 are spaced apart in a circumferential direction thereof so as to allow the one end 321V of the V phase winding 32V to be inserted from the space between the one pair of extended portions 423 into the U shaped portion 421.

Likewise, the third bus ring 43 integrally includes a U shaped portion 431 which is formed by bending the central conductor 400 into a U shape, held portions 432, which are held in the holding portion 331, and a pair of extended portions 433, which are provided between both ends of the U shaped portion 431 and the held portions 432, respectively, by extension in a radial direction of the third bus ring 43. The one pair of extended portions 433 of the third bus ring 43 are spaced apart in a circumferential direction thereof so as to allow the one end 321W of the W phase winding 32W to be inserted from the space between the one pair of extended portions 433 into the U shaped portion 431.

The first bus ring 41 includes bent portions 413a between the held portions 412 and the extended portions 413 respectively. In this embodiment, respective bend angles of the bent portions 413a (i.e. angles between the held portions 412 and the extended portions 413) are obtuse in such a manner that the space between the one pair of extended portions 413 is narrower inward in a radial direction of the first bus ring 41 (with decreasing distance to the U shaped portion 411). That is, the one pair of extended portions 413 extend obliquely to the radial direction of the first bus ring 41 and inward in the radial direction of the first bus ring 41. The respective bent portions 413a of the one pair of extended portions 413 are spaced apart in the circumferential direction of the first bus ring 41. The bent portions 423a of the second bus ring 42 are likewise spaced apart in the circumferential direction thereof, and the bent portions 433a of the third bus ring 43 are likewise spaced apart in the circumferential direction thereof.

The U shaped portion 411 of the first bus ring 41 comprises a circular arc shaped portion 411a, and one pair of shafts 411b and 411c being opposite each other in the circumferential direction of the first bus ring 41 with the circular arc shaped portion 411a therebetween and extending in an axial direction of the first bus ring 41. Likewise, the U shaped portion 421 of the second bus ring 42 comprises a circular arc shaped portion 421a, and one pair of shafts 421b and 421c being opposite each other in the circumferential direction of the second bus ring 42 with the circular arc shaped portion 421a therebetween and extending in an axial direction of the second bus ring 42. Likewise, the U shaped portion 431 of the third bus ring 43 comprises a circular arc shaped portion 431a, and one pair of shafts 431b and 431c being opposite each other in the circumferential direction of the third bus ring 43 with the circular arc shaped portion 431a therebetween and extending in an axial direction of the third bus ring 43.

The one pair of shafts 411b and 411c of the first bus ring 41 are formed with circular arc shaped projections 411d and 411e on their facing portions respectively being larger in curvature than an outer peripheral surface of the central conductor 400 at the held portions 412 and the extended portions 413. The opposite surfaces of the one pair of shafts 411b and 411c to the projections 411d and 411e are formed as flat side surfaces 411f and 411g respectively at right angles to the circumferential direction of the first bus ring 41.

Also, as with the one pair of shafts 411b and 411c of the first bus ring 41, one pair of shafts 421b and 421c of the second bus ring 42 are formed with circular arc shaped projections 421d and 421e respectively and flat side surfaces 421f and 421g respectively as shown in FIG. 6B, and one pair of shafts 431b and 431c of the third bus ring 43 are formed with circular arc shaped projections 431d and 431e respectively and flat side surfaces 431f and 431g respectively as shown in FIG. 6C.

As shown in FIG. 4, the first, second, and third bus rings 41, 42, and 43 are formed with their respective eight U shaped portions 411, 421, and 431, which are formed at an equal pitch in the circumferential directions of the first, second, and third bus rings 41, 42, and 43 respectively. The shafts 411b and 411c of the U shaped portions 411 of the first bus ring 41 are formed shorter in length than the shafts 421b and 421c of the U shaped portions 421 of the second bus ring 42, and the shafts 431b and 431c of the U shaped portions 431 of the third bus ring 43 are formed longer in length than the shafts 421b and 421c of the U shaped portions 421 of the second bus ring 42. This allows the U shaped portions 411, 421, and 431 to be configured so that the location differences in the axial directions of the first, second, and third bus rings 41, 42, and 43 are eliminated by inserting the respective one ends 321U, 321V, and 321W of the windings 32 adjacent to the circular arc shaped portions 411a, 421a, and 431a into the U shaped portions 411, 421, and 431 respectively.

With the respective one ends 321U of the U phase windings 32U inserted in the U shaped portions 411 respectively, the first bus ring 41 and the U phase windings 32U are electrically connected together at those U shaped portions 411 respectively. Likewise, with the respective one ends 321V of the V phase windings 32V inserted in the U shaped portions 421 respectively, the second bus ring 42 and the V phase windings 32V are electrically connected together at those U shaped portions 421 respectively. Likewise, with the respective one ends 321W of the W phase windings 32W inserted in the U shaped portions 431 respectively, the third bus ring 43 and the W phase windings 32W are electrically connected together at those U shaped portions 431 respectively.

As shown in FIGS. 2 and 3, the plurality of holding portions 331 are arranged on the stator 3 and spaced in the circumferential direction of the stator 3, and the first, second, and third bus rings 41, 42, and 43 are arranged in such a manner that their respective pairs of extended portions 413, 423, and 433 project from between pairs of the adjacent holding portions 331 in the circumferential direction of the stator 3, and in inserting directions of the respective held portions 412, 422, and 432 into the first, second, and third recesses 331a, 331b, and 331c of the pairs of the adjacent holding portions 331, respectively.

In this embodiment, the respective held portions 412, 422, and 432 of the first, second, and third bus rings 41, 42, and 43 are inserted inward in radial directions, respectively, of the stator 3 and into the first, second, and third recesses 331a, 331b, and 331c respectively, so that their respective pairs of extended portions 413, 423, and 433 are arranged by projecting from the spaces between the pairs of the holding portions 331 of the adjacent insulators 33 toward the outer walls 333 respectively. This allows the respective U shaped portions 411, 421, and 431 of the first, second, and third bus rings 41, 42, and 43 to be positioned opposite the notches 333a formed in the outer walls 333 respectively.

Also, a pitch between the pairs of the adjacent holding portions 331 in the circumferential direction of the stator 3 accommodates a width of the respective pairs of extended portions 413, 423, and 433 in circumferential directions of the first, second, and third bus rings 41, 42, and 43. Here, the term "a pitch accommodates a width" refers to a dimension relationship which allows the respective pairs of extended portions 413, 423, and 433 of the first, second, and third bus rings 41, 42, and 43 to be arranged between the pairs of the adjacent holding portions 331 respectively, and which allows the respective U shaped portions 411, 421, and 431 of the first, second, and third bus rings 41, 42, and 43 to be positioned opposite the notches 333a respectively by abutment between the respective pairs of extended portions 413, 423, and 433 of the first, second, and third bus rings 41, 42, and 43 and the respective guiding portions 331e and 331f of the adjacent holding portions 331 respectively.

Figure 7A:
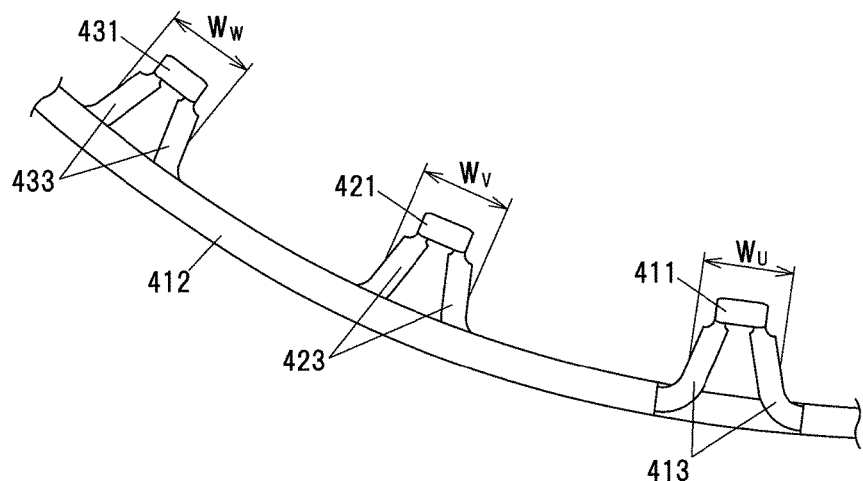
FIG. 7A is a partial plan view showing an electrical collecting and distributing ring viewed in its axial direction.

FIG. 7A is a partial plan view showing the electrical collecting and distributing ring 4 viewed in its axial direction. In this embodiment, the width $W_U$ in the ring 4 circumferential direction of one pair of extended portions 413 of the first bus ring 41, the width $W_V$ in the ring 4 circumferential direction of one pair of extended portions 423 of the second bus ring 42, and the width $W_W$ in the ring 4 circumferential direction of one pair of extended portions 433 of the third bus ring 43 are the same. Note that, in FIG. 7A, the width $W_U$, $W_V$, and $W_W$ are shown as widths in the circumferential direction in the middles of the extended portions 413, 423, and 433 respectively.

Figure 7B:
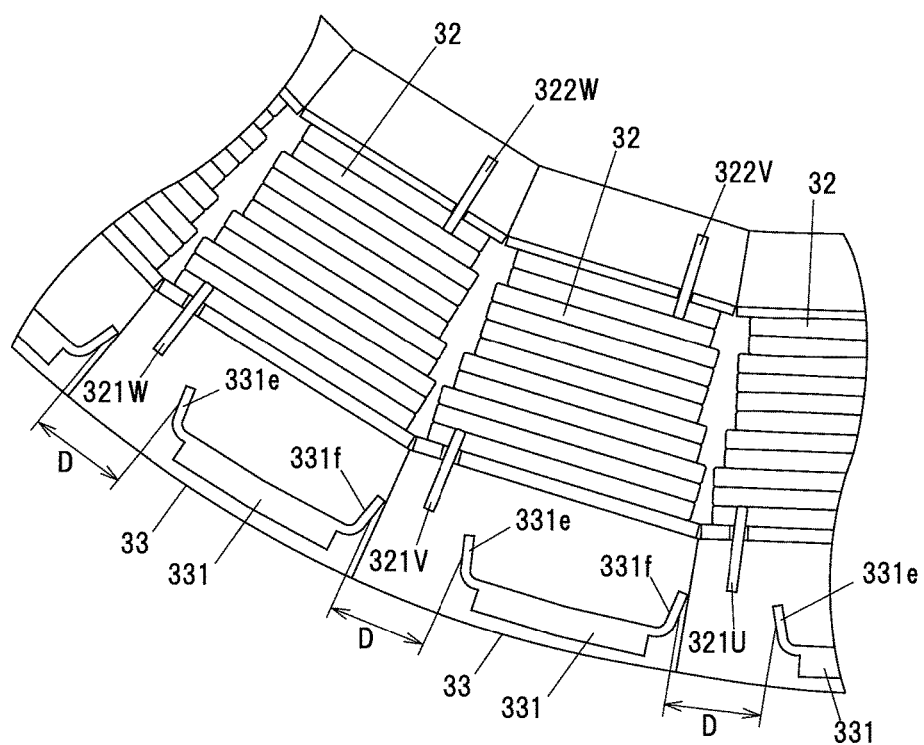
FIG. 7B is a partial plan view showing a stator viewed in its axial direction and corresponding to the part shown in FIG. 7A.

FIG. 7B is a partial plan view showing the stator 3 viewed in its axial direction and corresponding to the part shown in FIG. 7A. The pitch D between the pairs of the adjacent holding portions 331 (i.e. the space D between the respective guiding portions 331e and 331f of the adjacent holding portions 331) in the circumferential direction of the stator 3 is slightly larger than the width $W_U$, $W_V$, and $W_W$. The pitch D between the pairs of the adjacent holding portions 331 is, for example, not less than 1.01 and not more than 1.1 times the width $W_U$, $W_V$, and $W_W$. This results in slight gaps forming between outer surfaces of the respective guiding portions 331e and 331f of the adjacent holding portions 331 and the pairs of extended portions 413, 423, and 433 respectively. Note that, in FIG. 7B, the pitch D is shown as opposite spaces between the adjacent holding portions 331 to the middles of the pairs of extended portions 413, 423, and 433 respectively shown in FIG. 7A.

(Motor 1 Producing Method)

Next, a method for producing the motor 1 is described. Note that the production method described below is given as one specific example of the method for producing the motor 1 and it is possible to produce the motor 1 even without depending on this procedure.

The method for producing the motor 1 includes a core assembly producing step, an arranging step, a holding step, a first connecting step, and a second connecting step. Specifically, the core assembly producing step includes mounting insulators 33 to cores 31 respectively and winding windings 32 around respective electrically insulating portions 332 of the insulators 33 respectively to produce a multiplicity of core assemblies 30. The arranging step includes annularly arranging the multiplicity of core assemblies 30 to form stator 3. The holding step includes holding first, second, and third bus rings 41, 42, and 43 in respective holding portions 331 of the insulators 33. The first connecting step includes connecting together respective one ends 321U, 321V, and 321W of the U, V, and W phase windings 32U, 32V, and 32W, and the first, second, and third bus rings 41, 42, and 43 respectively. The second connecting step includes arranging fourth bus ring 44 on respective inner flanges 336 of the insulators 33 and connecting the fourth bus ring 44 to the respective other ends 322U, 322V, and 322W of the U, V, and W phase windings 32U, 32V, and 32W.

Figure 8:
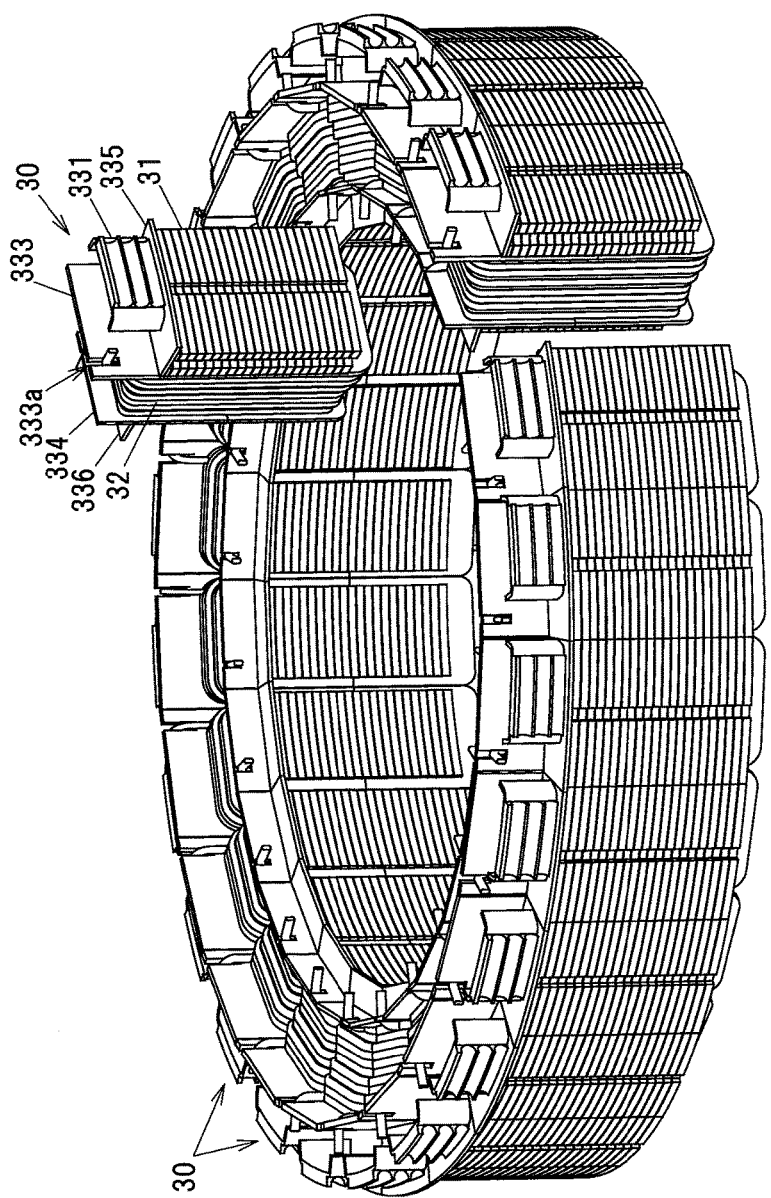
FIG. 8 is an explanatory diagram showing an arranging step in a motor producing method.

FIG. 8 is an explanatory diagram showing the arranging step. In the arranging step, the 24 core assemblies 30 are arranged annularly to form the stator 3. As described earlier, since the widths of the holding portions 331 in the circumferential direction of the stator 3 are narrower than the widths in that circumferential direction of respective outer flanges 335 of the insulators 33 respectively, gaps form between the pairs of the adjacent holding portions 331 respectively.

In the holding step, with feeding terminals 410, 420, and 430 crimped to only respective one ends of the first, second, and third bus rings 41, 42, and 43 respectively, respective held portions 412, 422, and 432 of the first, second, and third bus rings 41, 42, and 43 are, in turn, inserted into first, second, and third recesses 331a, 331b, and 331c, respectively, of each of the holding portions 331, to hold the first, second, and third bus rings 41, 42, and 43 around the stator 3. Thereafter, the feeding terminals 410, 420, and 430 are crimped to the respective other ends of the first, second, and third bus rings 41, 42, and 43 respectively as well. This results in the first, second, and third bus rings 41, 42, and 43 being annular while being prevented from radial outward spreading and their respective held portions 412, 422, and 432' slipping out of the first, second, and third recesses 331a, 331b, and 331c respectively. Thus, the first, second, and third bus rings 41, 42, and 43 are securely held in the holding portions 331.

Note that in the holding step, the crimping of the feeding terminals 410, 420, and 430 to the respective one ends of the first, second, and third bus rings 41, 42, and 43 respectively is performed before inserting the respective held portions 412, 422, and 432 of the first, second, and third bus rings 41, 42, and 43 into the first, second, and third recesses 331a, 331b, and 331c, respectively, of each of the holding portions 331, but instead the inserting of the respective held portions 412, 422, and 432 into the first, second, and third recesses 331a, 331b, and 331c, respectively, of each of the holding portions 331 may first be performed and the feeding terminals 410, 420, and 430 may then be crimped to the respective central conductors 400 at the respective one ends and the respective other ends of the first, second, and third bus rings 41, 42, and 43 respectively.

That is, the connecting of the feeding terminals 410, 420, and 430 to both the respective ends of the first, second, and third bus rings 41, 42, and 43 respectively may be performed after the inserting of the respective held portions 412, 422, and 432 into the first, second, and third recesses 331a, 331b, and 331c, respectively, of each of the holding portions 331. In other words, the holding step includes partially receiving the first, second, and third bus rings 41, 42, and 43 in the first, second, and third recesses 331a, 331b, and 331c respectively, and thereafter connecting both the respective ends of the central conductors 400 to the feeding terminals 410, 420, and 430 respectively.

Figure 9:
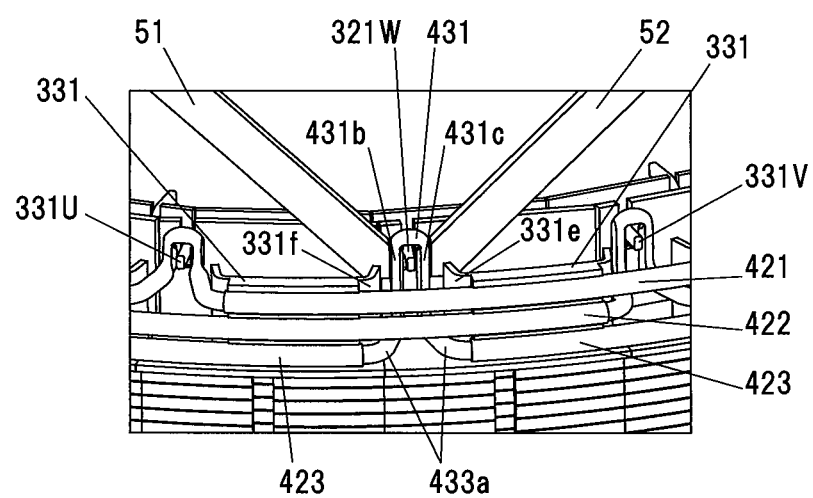
FIG. 9 is an explanatory diagram showing a first connecting step in the motor producing method.

FIG. 9 is an explanatory diagram showing the first connecting step. FIG. 9 shows connection of one end 321W of the W phase winding 32W to the U shaped portion 431 of the third bus ring 43 as an example. Connections between the U shaped portions 411 and 421 of the first and second bus rings 41 and 42 and respective one ends 321U and 321V of the U and V phase windings 32U and 32V respectively may be performed in the same manner.

Figure 10A:
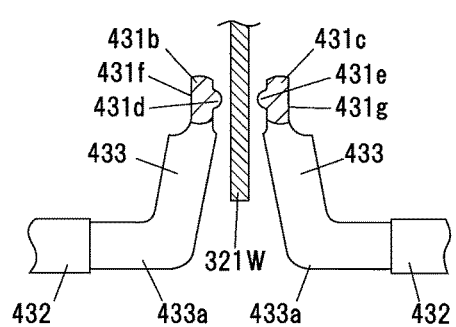
FIGS. 10A and 10B are cross-sectional views showing a U shaped portion of a third bus ring and one end of a W phase winding before performing the first connecting step.
Figure 10B:
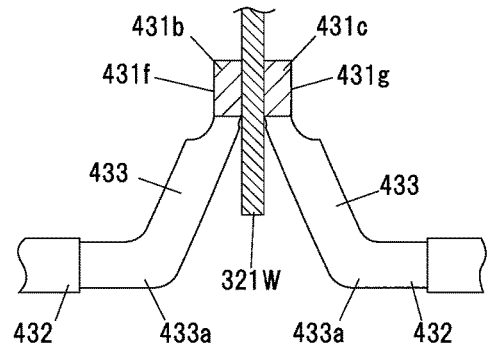
Figure 10C:
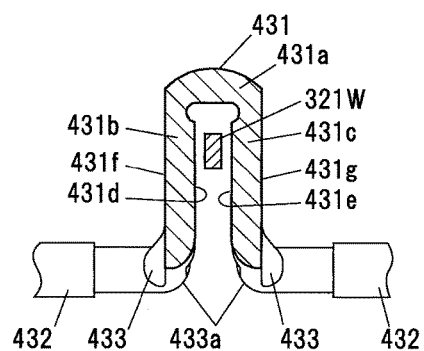
FIGS. 10C and 10D are cross-sectional views showing the U shaped portion of the third bus ring and the one end of the W phase winding after performing the first connecting step.
Figure 10D:
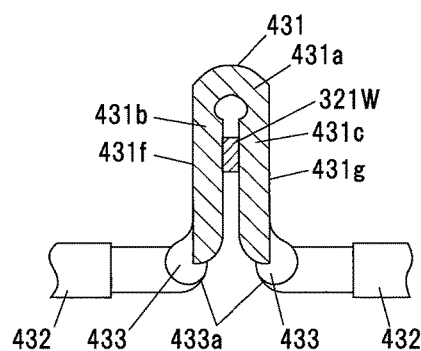

FIGS. 10A and 10B are cross-sectional views showing the U shaped portion 431 of the third bus ring 43 and one end 321W of the W phase winding 32W before performing the first connecting step, and FIGS. 10C and 10D are cross-sectional views showing the U shaped portion 431 of the third bus ring 43 and one end 321W of the W phase winding 32W after performing the first connecting step. FIGS. 10A and 10B are the cross-sectional views when the U shaped portion 431 is cut along one end 321W of the W phase winding 32W, and FIGS. 10C and 10D are the cross-sectional views when the U shaped portion 431 is cut at right angles to one end 321W of the W phase winding 32W.

The first, second, and third bus rings 41, 42, and 43 and the U, V, and W phase windings 32U, 32V, and 32W respectively are electrically connected together by caulking the U shaped portions 411, 421, and 431 with the respective one ends 321U, 321V, and 321W of the U, V, and W phase windings 32U, 32V, and 32W inserted therein respectively.

More specifically, in the present embodiment, these connections are performed by heat caulking (fusing). That is, the first, second, and third bus rings 41, 42, and 43 and the U, V, and W phase windings 32U, 32V, and 32W respectively are electrically connected together by caulking while heating the U shaped portions 411, 421, and 431 with the respective one ends 321U, 321V, and 321W of the U, V, and W phase windings 32U, 32V, and 32W inserted therein respectively. The U shaped portions 411, 421, and 431 are pre-plated with tin, so that the first, second, and third bus rings 41, 42, and 43 and the U, V, and W phase windings 32U, 32V, and 32W respectively are more securely electrically connected together by the tin plate melting due to heating.

This heat caulking is performed as follows: As shown in FIG. 9, a positive electrode 51 is brought into contact with a side surface 431f (shown in FIG. 10), while a negative electrode 52 is brought into contact with a side surface 431g (shown in FIG. 10). With one pair of shafts 431b and 431c being pressed against one end 321W of the W phase winding 32W with the positive electrode 51 and the negative electrode 52, direct current voltage is applied between the positive electrode 51 and the negative electrode 52. Then, direct current flows, in turn through the positive electrode 51, the shaft 431b of the U shaped portion 431, one end 321W of the W phase winding 32W, the shaft 431c of the U shaped portion 431, and the negative electrode 52. Joule heat resulting from the direct current flowing first melts the tin plate and then the circular arc shaped projections 431d and 431e of the U shaped portion 431. This results in the electrical connection between the U shaped portion 431 of the third bus ring 43 and one end 321W of the W phase winding 32W.

Note that as shown in FIG. 10, this heat caulking narrows the distance between one pair of shafts 431b and 431c, but this variation in the distance between the shafts 431b and 431c is cancelled out by variations in slopes of one pair of extended portions 433 relative to the radial direction of the third bus ring 43. That is, in the first connecting step, one end 321W of the winding 32W is inserted in the U shaped portion 431 of the third bus ring 43, caulked by both sides of the U shaped portion 431 in the circumferential direction of the third bus ring 43, and clamped between the one pair of shafts 431b and 431c of the U shaped portion 431, so that the one end 321W of the winding 32W is electrically connected to the U shaped portion 431 of the third bus ring 43 with the one pair of extended portions 433 being not in contact with each other, with the bent portions 433a being not in contact with each other, and with the third bus ring 43 being prevented from radial contraction due to the heat caulking, after the connection.

Note that, as with the third bus ring 43, for the first and second bus rings 41 and 42, their respective pairs of extended portions 413 and 423 are not in contact with each other, respectively, with their respective U shaped portions 411 and 421 connected to the respective one ends 321U and 321V of the windings 32U and 32V, respectively.

(Functions and Advantageous Effects of the First Embodiment)

The above described embodiment has the following functions and advantageous effects.

(1) The first, second, and third bus rings 41, 42, and 43 are held in the holding portions 331 formed on the insulators 33. Therefore, for example, there is no need of integrating together the first, second, and third bus rings 41, 42, and 43 with a molded resin. Thus, it is possible to lower production cost for the electrical collecting and distributing ring 4 and the motor 1.

(2) The respective first, second, and third recesses 331a, 331b, and 331c of the holding portions 331 are formed in the axial direction of the stator 3, and are open in the radial direction of the stator 3. Therefore, for example, it is possible to radially spread the first, second, and third bus rings 41, 42, and 43 prior to crimping the feeding terminals 410, 420, and 430, and insert, in turn, the respective held portions 412, 422, and 432 of the first, second, and third bus rings 41, 42, and 43 into the respective first, second, and third recesses 331a, 331b, and 331c of the holding portions 331 formed on multiple areas respectively in the circumferential direction of the stator 3. Thus, assembling thereof is facilitated.

(3) The respective held portions 412, 422, and 432 of the first, second, and third bus rings 41, 42, and 43 are inserted by press fitting into the first, second, and third recesses 331a, 331b, and 331c, respectively. Therefore, the held portions 412, 422, and 432, once inserted, do not slip out of the first, second, and third recesses 331a, 331b, and 331c respectively. Thus, assembling thereof is further facilitated.

(4) The first, second, and third bus rings 41, 42, and 43 are each formed with their respective U shaped portions 411, 421, and 431, held portions 412, 422, and 432, and extended portions 413, 423, and 433, by bending one electrically insulated wire, and are electrically connected to the U, V, and W phase windings 32U, 32V, and 32W respectively with the respective one ends 321U, 321V, and 321W of the U, V, and W phase windings 32U, 32V, and 32W inserted in the respective U shaped portions 411, 421, and 431 of the first, second, and third bus rings 41, 42, and 43 respectively. Therefore, for example, there is no need of using connecting terminals to connect together the first, second, and third bus rings 41, 42, and 43 and the U, V, and W phase windings 32U, 32V, and 32W respectively. Thus, it is possible to enhance production efficiency and lower production cost for the electrical collecting and distributing ring 4 and the motor 1.

(5) The first, second, and third bus rings 41, 42, and 43 and the U, V, and W phase windings 32U, 32V, and 32W are connected together by heat caulking the U shaped portions 411, 421, and 431 respectively. Therefore, their respective firm connections are possible.

(6) The respective pairs of extended portions 413, 423, and 433 of the first, second, and third bus rings 41, 42, and 43 are arranged by projecting from between the adjacent holding portions 331 respectively in the circumferential direction of the stator 3 inward in radial directions, respectively, of the stator 3. Therefore, for example, it is possible to coplanarly arrange the held portions 412, 422, and 423 and the extended portions 413, 423, and 433 respectively, and thereby suppress increases in respective axial direction dimensions of the first, second, and third bus rings 41, 42, and 43. Also, even in the event of the occurrence of radial contractions of the first, second, and third bus rings 41, 42, and 43 due to the caulking of the U shaped portions 411, 421, and 431, the held portions 412, 422, and 423 fit deep into the first, second, and third recesses 331a, 331b, and 331c respectively due to the radial contractions. The first, second, and third bus rings 41, 42, and 43 are therefore more securely be held in the holding portions 311.

(7) The pitch between the adjacent holding portions 331 in the circumferential direction of the stator 3 accommodates the width of the respective pairs of extended portions 413, 423, and 433 in circumferential directions of the first, second, and third bus rings 41, 42, and 43. Therefore, it is possible to position the U shaped portions 411, 421, and 431 opposite the notches 333a respectively, i.e. at locations for the respective one ends 321U, 321V, and 321W respectively of the U, V, and W phase windings 32U, 32V, and 32W to be inserted thereat. Thus, assembling thereof is enhanced.

(8) The respective pairs of extended portions 413, 423, and 433 are not in contact with each other, respectively, with the respective U shaped portions 411, 421, and 431 connected to the respective one ends 321U, 321V, and 321W of the U, V, and W phase windings 32U, 32V, and 32W, respectively. Therefore, it is possible to securely connect together the first, second, and third bus rings 41, 42, and 43 and the U, V, and W phase windings 32U, 32V, and 32W respectively without contacts between the respective pairs of extended portions 413, 423, and 433 preventing the caulking of the respective U shaped portions 411, 421, and 431, and it is possible to suppress the occurrence of radial contractions of the first, second, and third bus rings 41, 42, and 43 due to the caulking of the U shaped portions 411, 421, and 431.

Second Embodiment

Next, a second embodiment of the present invention is described.

Figure 11:
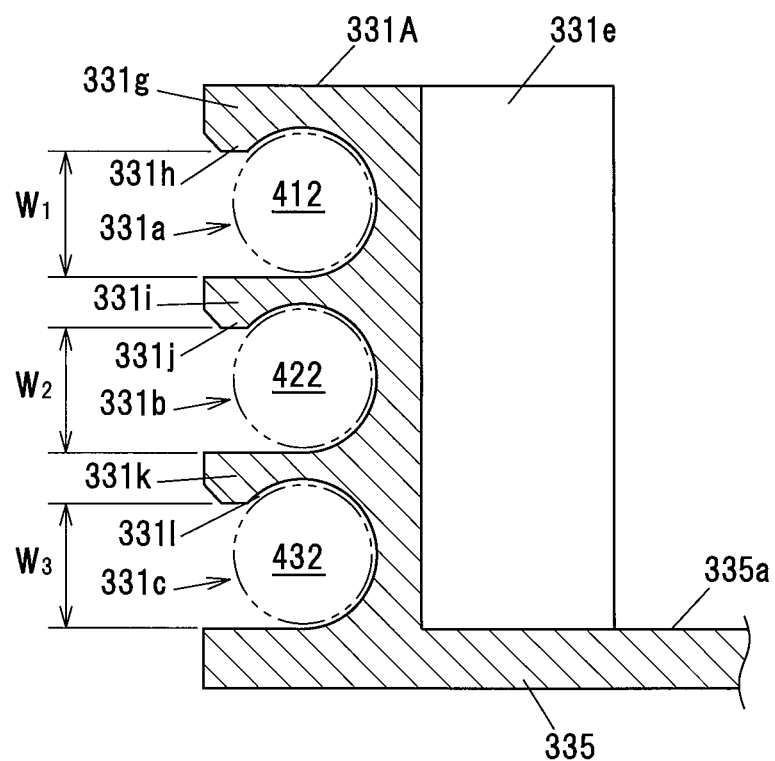
FIG. 11 is an enlarged cross-sectional view showing a holding portion of an insulator in a second embodiment.

FIG. 11 is an enlarged cross-sectional view showing a holding portion 331A of an insulator 33 in the second embodiment. Because the insulator 33 in the second embodiment is similar to that of the first embodiment except that its holding portion 331A is different in shape from the holding portion 331 in the first embodiment, elements in common with those described for the first embodiment are given the same numerals or characters used in the first embodiment, and duplicated descriptions thereof are omitted.

In this embodiment, the holding portion 331A is provided with locking portions 331h, 331j, and 331l to lock the first, second, and third bus rings 41, 42, and 43 respectively in the holding portion 331A, to prevent the first, second, and third bus rings 41, 42, and 43 from slipping out of the first, second, and third recesses 331a, 331b, and 331c respectively.

This antislip structure is more specifically described with reference to FIG. 11. The first recess 331a, which holds the held portion 412 (indicated by the alternate long and two short dashes line in FIG. 11) of the first bus ring 41, is provided between an upper wall 331g and an intermediate wall 331i, and the locking portion 331h is formed in such a manner as to project from a tip of the upper wall 331g toward the intermediate wall 331i.

Also, the second recess 331b, which holds the held portion 422 (indicated by the alternate long and two short dashes line in FIG. 11) of the second bus ring 42, is provided between the intermediate wall 331i and a lower wall 331k, and the locking portion 331l is formed in such a manner as to project from a tip of the intermediate wall 331i toward the lower wall 331k.

Still further, the third recess 331c, which holds the held portion 432 (indicated by the alternate long and two short dashes line in FIG. 11) of the third bus ring 43, is provided between the lower wall 331k and the outer flange 335, and the locking portion 331l is formed in such a manner as to project from a tip of the lower wall 331k toward the outer flange 335.

The space $W_1$ between the locking portion 331h and the intermediate wall 331i is smaller than the diameter of the held portion 412 of the first bus ring 41. Likewise, the space $W_2$ between the locking portion 331j and the lower wall 331k is smaller than the diameter of the held portion 422 of the second bus ring 42. Likewise, the space $W_3$ between the locking portion 331l and the outer flange 335 is smaller than the diameter of the held portion 423 of the third bus ring 43. For this reason, the insertion of the first, second, and third bus rings 41, 42, and 43 into the first, second, and third recesses 331a, 331b, and 331c respectively of the holding portion 331A is performed by press fitting with the upper wall 331g, the intermediate wall 331i, and the lower wall 331k being elastically deformed.

The second embodiment allows the locking portions 331h, 331j, and 331l to more securely prevent the first, second, and third bus rings 41, 42, and 43 from slipping out of the first, second, and third recesses 331a, 331b, and 331c respectively.

Third Embodiment

Next, a third embodiment of the present invention is described.

In the first embodiment, the respective shafts 411b and 411c of the U shaped portions 411 of the first bus ring 41, the respective shafts 421b and 421c of the U shaped portions 421 of the second bus ring 42, and the respective shafts 431b and 431c of the U shaped portions 431 of the third bus ring 43 are different in length, whereas in the third embodiment, the first, second, and third bus rings 41, 42, and 43 are identically shaped. Also, in the third embodiment, the core assembly 30 is different in shape from that of the first embodiment.

Figure 12:
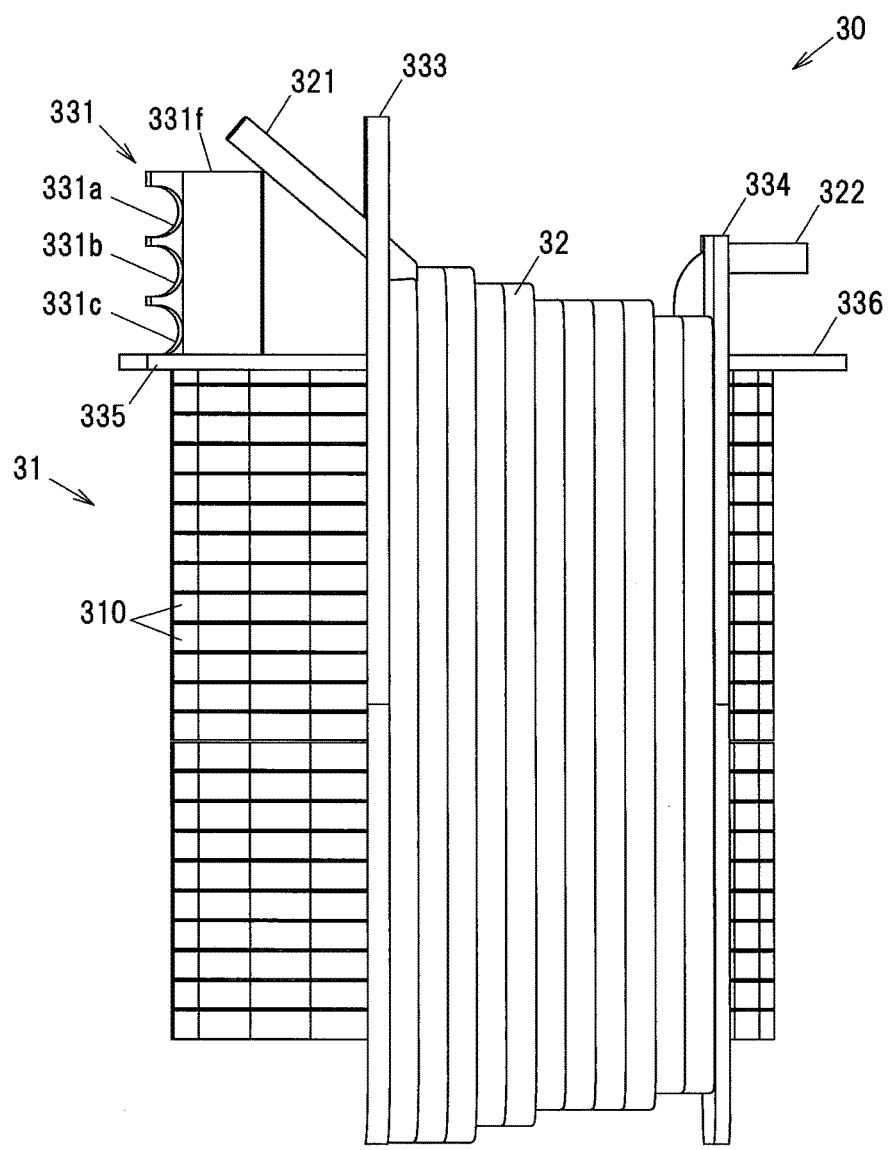
FIG. 12 is a side view showing a core assembly in a third embodiment.

FIG. 12 is a side view showing the core assembly 30 in the third embodiment. In the first embodiment, the respective one ends of the windings 32 (i.e. the respective one ends 321U, 321V, and 321W of the U, V, and W phase windings 32U, 32V, and 32W) project parallel to the radial directions respectively of the stator 3 from the respective notches 333a of the outer walls 33 of the insulators 33, whereas in the third embodiment, as shown in FIG. 12, one end 321 of the winding 32 projects obliquely to the radial direction of the stator 3 in such a manner that its distance from the outer flange 335 increases toward its tip. Also, the notch 333a of the outer wall 33 is longer in length than that of the first embodiment.

With the core assembly 30 as shown in FIG. 12, the winding 32 is one of the U, V, and W phase windings 32U, 32V, and 32W, depending on its arrangement location in the stator 3, and one end 321 of the winding 32 is one of the respective one ends 321U, 321V, and 321W of the U, V, and W phase windings 32U, 32V, and 32W. The other end 322 of the winding 32 is connected to the fourth bus ring 44.

Figure 13A:
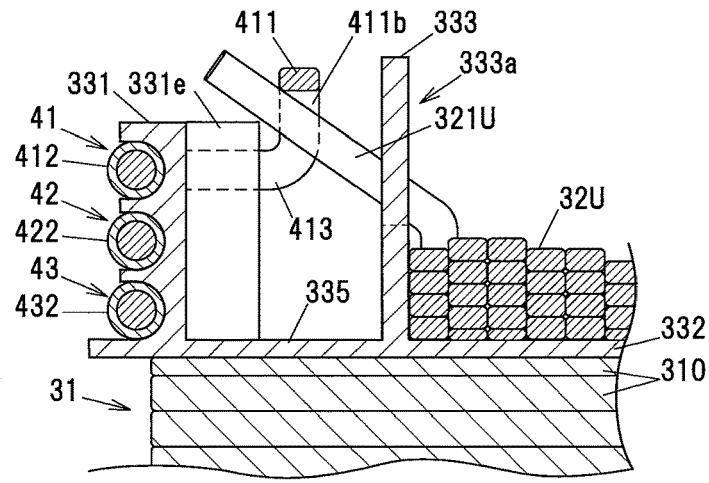
FIG. 13A is a cross-sectional view showing a connecting structure between a first bus ring and one end of a U phase winding in the third embodiment.
Figure 13B:
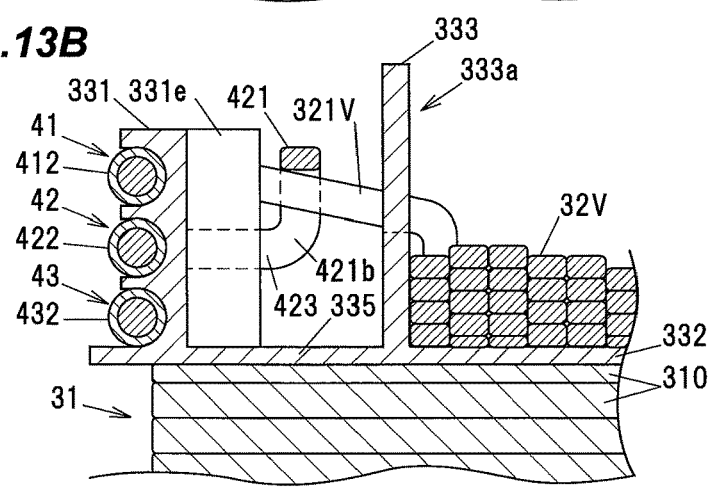
FIG. 13B is a cross-sectional view showing a connecting structure between a second bus ring and one end of a V phase winding in the third embodiment.
Figure 13C:
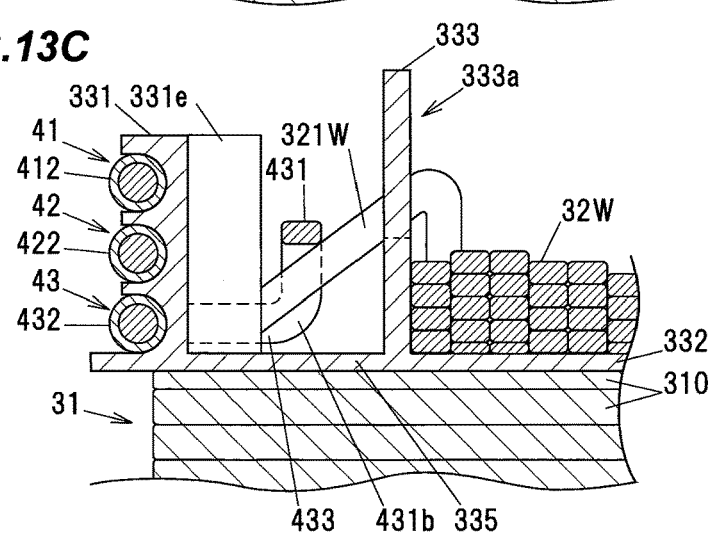
FIG. 13C is a cross-sectional view showing a connecting structure between a third bus ring and one end of a W phase winding in the third embodiment.

FIG. 13A is a cross-sectional view showing a connecting structure between the first bus ring 41 and one end 321U of the U phase winding 32U in the third embodiment. FIG. 13B is a cross-sectional view showing a connecting structure between the second bus ring 42 and one end 321V of the V phase winding 32V in the third embodiment. FIG. 13C is a cross-sectional view showing a connecting structure between the third bus ring 43 and one end 321W of the W phase winding 32W in the third embodiment.

As shown in FIGS. 13A to 13C in the third embodiment, the shafts 411b and 411c of the U shaped portion 411 of the first bus ring 41, the shafts 421b and 421c of the U shaped portion 421 of the second bus ring 42, and the shafts 431b and 431c of the U shaped portion 431 of the third bus ring 43 are common in length, and the length of each of these shafts is the same as the lengths of the respective shafts 411b and 411c of the U shaped portions 411 of the first bus ring 41 in the first embodiment. That is, the shapes of the first, second, and third bus rings 41, 42, and 43 in the third embodiment are the same as the shape of the first bus ring 41 in the first embodiment.

As shown in FIG. 13A, in the third embodiment, one end 321U of the U phase winding 32U is connected to the U shaped portion 411 of the first bus ring 41 without being bent from the state of the core assembly 30 as shown in FIG. 12. This connection can be performed by, for example, heat caulking described with reference to FIGS. 9 and 10A to 10D in the first embodiment.

As shown in FIG. 13B, the connection between the second bus ring 42 and one end 321V of the V phase winding 32V is performed by contacting the second bus ring 42 and the V phase winding 32V together, bending the V phase winding 32V downward (toward the outer flange 335), and inserting the one end 321V of the V phase winding 32V into the U shaped portion 421 of the second bus ring 42. This bending of the V phase winding 32V may be performed by downward movement of the second bus ring 42, and may be performed prior to assembling of the second bus ring 42.

As shown in FIG. 13C, the connection between the third bus ring 43 and one end 321W of the W phase winding 32W is performed by contacting the third bus ring 43 and the W phase winding 32W together, bending the W phase winding 32W downward (toward the outer flange 335), and inserting the one end 321W of the W phase winding 32W into the U shaped portion 431 of the third bus ring 43. This bending of the W phase winding 32W may be performed by downward movement of the third bus ring 43, and may be performed prior to assembling of the third bus ring 43. Also, the W phase winding 32W is bent downward more greatly than the V phase winding 32V.

That is, in addition to each step of the method for producing the motor 1 described in the first embodiment, the third embodiment includes bending at least some of the U, V, and W phase windings 32U, 32V, and 32W depending on locations of the first, second, and third bus rings 41, 42, and 43, respectively, in the axial direction of the stator 3, and aligning the U, V, and W phase winding portions connected with the first, second, and third bus rings 41, 42, and 43, respectively.

In the third embodiment, the first, second, and third bus rings 41, 42, and 43 are identically shaped. Therefore, it is possible to reduce the number of kinds of parts in the electrical collecting and distributing ring 4 and the motor 1 and also reduce the occurrence of defective products due to misassembling.

Note that although in the third embodiment, it has been described that the respective one ends 321 of the windings 32 are protruded beforehand upward (in such a direction that its distance from the outer flange 335 increases) and then that the windings 32 protruded from the outer wall 333 are bent downward (toward the outer flange 335) depending on locations of the first, second, and third bus rings 41, 42, and 43, respectively, in the axial direction of the stator 3, the respective one ends 321 of the windings 32 may inversely be protruded downward beforehand and then bent upward depending on locations of the first, second, and third bus rings 41, 42, and 43, respectively. That is, when the first, second, and third bus rings 41, 42, and 43 are identically shaped, the effect of the present embodiment can be achieved by bending at least some of the U, V, and W phase windings 32U, 32V, and 32W depending on locations of the first, second, and third bus rings 41, 42, and 43, respectively, in the axial direction of the stator 3.

Fourth the Embodiment

Next, a fourth embodiment of the present invention is described.

In the first to third embodiments, the first, second, and third recesses 331a, 331b, and 331c of the holding portion 331 or 331A are arranged in the axial direction of the stator 3, and the first, second, and third bus rings 41, 42, and 43 are arranged on top of each other, and first, second, and third bus rings 41, 42, and 43 are arranged in an axial direction of the stator 3, whereas in the fourth embodiment, in a holding portion 331B, the first, second, and third recesses 331a, 331b, and 331c holding the first, second, and third bus rings 41, 42, and 43 respectively are formed side by side in the radial direction of the stator 3.

Figure 14A:
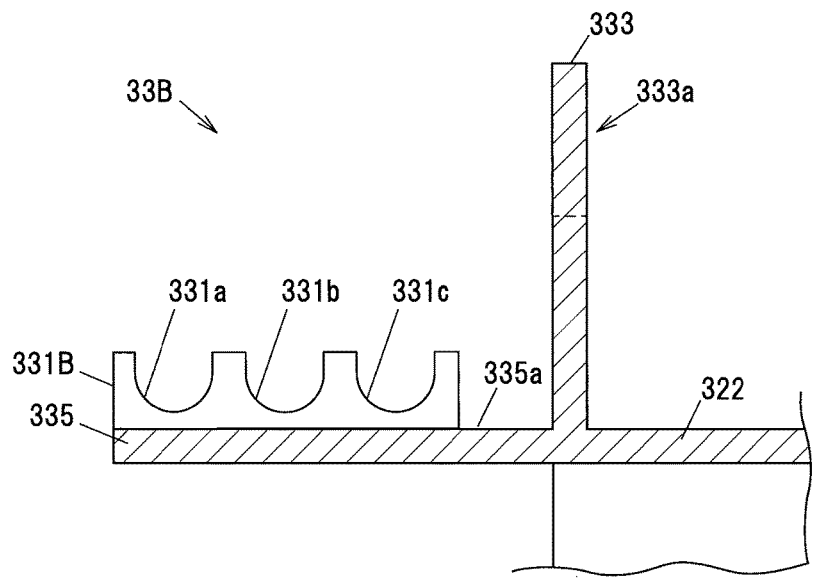
FIG. 14A is a partial enlarged cross-sectional view showing an insulator in a fourth embodiment.
Figure 14B:
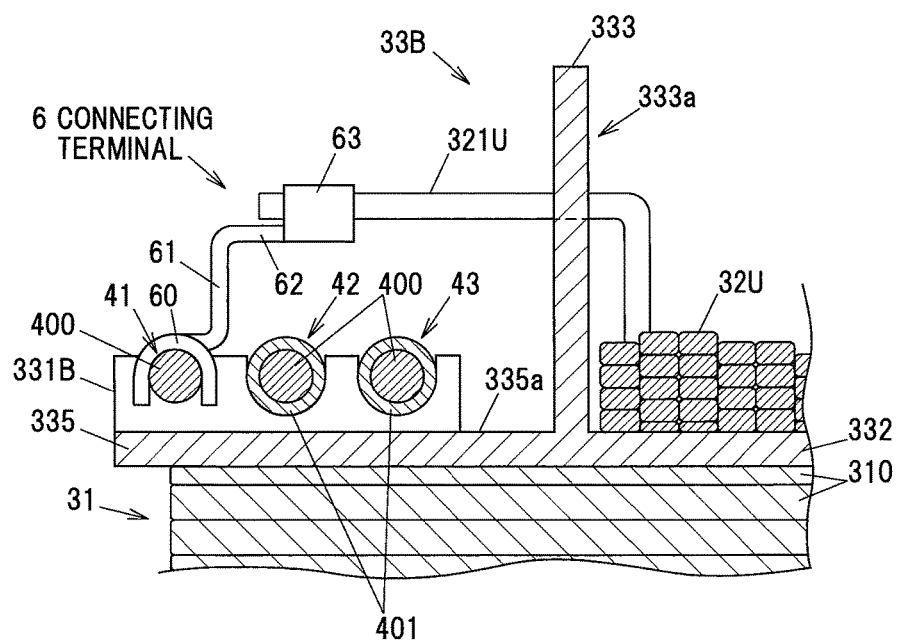
FIG. 14B is a cross-sectional view showing the insulator with a core and first, second, and third bus rings assembled thereto.

FIG. 14A is a partial enlarged cross-sectional view showing an insulator 33B in the fourth embodiment. FIG. 14B is a cross-sectional view showing the insulator 33B with the core 31 and the first, second, and third bus rings 41, 42, and 43 assembled thereto. In FIGS. 14A and 14B, elements in common with those described for the first embodiment are given the same numerals or characters used in the first embodiment, and duplicated descriptions thereof are omitted.

As shown in FIG. 14A, the holding portion 331B is provided on the upper surface 335a of the outer flange 335. The holding portion 331B is formed with the first recess 331a at an outermost circumference, and the third recess 331c at an innermost circumference. The second recess 331b is formed between the first recess 331a and the third recess 331c.

As shown in FIG. 14B, the first bus ring 41 is partially received in the first recess 331a, and the second bus ring 42 is partially received in the second recess 331b. Also, the third bus ring 43 is partially received in the third recess 331c. The first bus ring 41 is larger in diameter than the second bus ring 42, and the third bus ring 43 is smaller in diameter than the second bus ring 42.

As shown in FIG. 14B, for the first bus ring 41, its insulator 401 is removed and its portion where its central conductor 400 is exposed is connected with a connecting terminal 6, so that the first bus ring 41 is electrically connected to one end 321U of the U phase winding 32U via that connecting terminal 6. Note that although not shown, the second bus ring 42 and the third bus ring 43 are likewise electrically connected to the windings 32 via the connecting terminals 6 respectively.

The connecting terminals 6 include a first connecting portion 60, which is connected to the central conductor 400 by caulking, a first extended portion 61, which extends from the first connecting portion 60 in the axial direction of the stator 3, a second extended portion 62, which extends from an end of the first extended portion 61 in the radial direction of the stator 3 toward the outer wall 333, and a second connecting portion 63, which is connected by caulking to the respective one end of the windings 32 (in FIG. 14B, one end 321U of the U phase winding 32U).

The fourth embodiment allows for reducing respective axial direction dimensions of receiving spaces for the first, second, and third bus rings 41, 42, and 43.

Summary of the Embodiment

Next, the technical concept that is ascertained from the embodiment described above will be described with the aid of reference characters and the like in the embodiment. It should be noted, however, that each of the reference characters in the following description should not be construed as limiting the constituent elements in the claims to the members and the like specifically shown in the embodiment.

[1] An electrical collecting and distributing member (41, 42, and 43) holding structure, comprising: a stator (3) including a multiplicity of cores (31) arranged annularly, windings (32) wound around the multiplicity of cores (31) respectively, and an insulator (33) for electrical insulation between the cores (31) and the windings (32); a plurality of annular electrical collecting and distributing members (41, 42, and 43) held around the stator (3) to collect and distribute electric current to the windings (32); and a holding portion (331) formed on the insulator (33), the holding portion (331) including a plurality of recesses (331a, 331b, and 331c) formed therein, the plurality of electrical collecting and distributing members (41, 42, and 43) being held in the holding portion (331) in such a manner as to be partially received in the plurality of recesses (331a, 331b, and 331c), respectively.

[2] The electrical collecting and distributing member (41, 42, and 43) holding structure according to [1] above, wherein the plurality of recesses (331a, 331b, and 331c) are being formed on top of each other in an axial direction of the stator (3), and are open in a radial direction of the stator (3).

[3] The electrical collecting and distributing member (41, 42, and 43) holding structure according to [1] above, wherein the plurality of electrical collecting and distributing members (41, 42, and 43) are being inserted by press fitting into the plurality of recesses (331a, 331b, and 331c), respectively.

[4] The electrical collecting and distributing member (41, 42, and 43) holding structure according to [1] above, further comprising a locking portion provided on the holding portion (331) to lock the electrical collecting and distributing members (41, 42, and 43) to prevent the electrical collecting and distributing members (41, 42, and 43) from slipping out of the recesses (331a, 331b, and 331c).

[5] The electrical collecting and distributing member (41, 42, and 43) holding structure according to [1] above, wherein the electrical collecting and distributing members (41, 42, and 43) integrally include a respective U shaped portion (411, 421, and 431), which is formed by bending a metal conductor into a U shape, respective held portions (412, 422, and 432), which are held in the holding portion (331), and a respective pair of extended portions (413, 423, and 433), which are provided between both ends of the respective U shaped portion (411, 421, and 431) and the respective held portions (412, 422, and 432), respectively, by extension in a radial direction of the annular electrical collecting and distributing members (41, 42, and 43), wherein the electrical collecting and distributing members (41, 42, and 43) and the windings (32) are electrically connected together with a respective end (321U, 321V, and 321W) of the windings (32) inserted in the respective U shaped portion (411, 421, and 431).

[6] The electrical collecting and distributing member (41, 42, and 43) holding structure according to [5] above, wherein the electrical collecting and distributing members (41, 42, and 43) and the windings (32) are electrically connected together by caulking the respective U shaped portion (411, 421, and 431) with the respective end (321U, 321V, and 321W) of the windings (32) inserted therein.

[7] The electrical collecting and distributing member (41, 42, and 43) holding structure according to [5] above, wherein the respective U shaped portion (411, 421, and 431) is plated with tin, and the electrical collecting and distributing members (41, 42, and 43) and the windings (32) are electrically connected together by heat caulking the respective U shaped portion (411, 421, and 431) with the respective end (321U, 321V, and 321W) of the windings (32) inserted therein.

[8] The electrical collecting and distributing member (41, 42, and 43) holding structure according to [6] above, wherein the respective pair of extended portions (413, 423, and 433) are not in contact with each other with the respective U shaped portion (411, 421, and 431) electrically connected to the respective end (321U, 321V, and 321W) of the windings (32).

[9] The electrical collecting and distributing member (41, 42, and 43) holding structure according to [5] above, wherein a plurality of the holding portions (331) are arranged on the stator (3) and spaced in a circumferential direction of the stator (3), and the electrical collecting and distributing members (41, 42, and 43) are arranged in such a manner that their respective pairs of extended portions (413, 423, and 433) project from between pairs of the adjacent holding portions (331) in the circumferential direction of the stator (3), and in inserting directions of the respective held portions (412, 422, and 432) into the recesses (331a, 331b, and 331c) of the pairs of the adjacent holding portions (331), respectively.

[10] The electrical collecting and distributing member (41, 42, and 43) holding structure according to [9] above, wherein a pitch (D) between the pairs of the adjacent holding portions (331) in the circumferential direction of the stator (3) accommodates a width ($W_U$, $W_V$, $W_W$) of the respective pairs of extended portions (413, 423, and 433) in the circumferential directions of the stator (3).

[11] The electrical collecting and distributing member (41, 42, and 43) holding structure according to [1] above, wherein the plurality of electrical collecting and distributing members (41, 42, and 43) are in identical shapes.

[12] The electrical collecting and distributing member (41, 42, and 43) holding structure according to [11] above, wherein at least some of the plurality of windings (32) are bent depending on locations of the plurality of electrical collecting and distributing members (41, 42, and 43), respectively, in an axial direction of the stator (3).

[13] The electrical collecting and distributing member (41, 42, and 43) holding structure according to [1] above, wherein the plurality of recesses (331a, 331b, and 331c) are being formed side by side in a radial direction of the stator (3), and are open in an axial direction of the stator (3).

[14] An electric motor (1), comprising: a stator (3) including a multiplicity of cores (31) arranged annularly, U, V, and W phase windings (32U, 32V, and 32W) wound around the multiplicity of cores (31) respectively, and an insulator (33) for electrical insulation between the cores (31) and the U, V, and W phase windings (32U, 32V, and 32W); a first annular electrical collecting and distributing member (41) to collect and distribute electric current to the U phase winding (32U); a second annular electrical collecting and distributing member (42) to collect and distribute electric current to the V phase winding (32V); a third annular electrical collecting and distributing member (43) to collect and distribute electric current to the W phase winding (32W); and a holding portion (331) formed on the insulator (33), the holding portion (331) including a plurality of recesses (331a, 331b, and 331c) formed therein, the first, second, and third electrical collecting and distributing members (41, 42, and 43) being partially received in the plurality of recesses (331a, 331b, and 331c), respectively, and held in the holding portion (331).

[15] A method for producing the electric motor (1) according to [14] above, comprising: holding the first, second, and third electrical collecting and distributing members (41, 42, and 43) in the holding portion (331); and connecting together the U, V, and W phase windings (32U, 32V, and 32W) and the first, second, and third electrical collecting and distributing members (41, 42, and 43), respectively.

[16] The electric motor (1) producing method according to [15] above, further comprising bending at least some of the U, V, and W phase windings (32U, 32V, and 32W) depending on locations of the first, second, and third electrical collecting and distributing members (41, 42, and 43), respectively, in the axial direction of the stator (3), and aligning the U, V, and W phase windings with connecting portions of the first, second, and third electrical collecting and distributing members (41, 42, and 43), respectively.

[17] The electric motor (1) producing method according to [15] above, further comprising forming the first, second, and third electrical collecting and distributing members (41, 42, and 43) of the electric motor (1) from linear conductors (400) into ring shapes respectively, and in the holding step, partially receiving the first, second, and third electrical collecting and distributing members (41, 42, and 43) in the plurality of recesses (331a, 331b, and 331c), respectively, and subsequently connecting both respective ends of the linear conductors (400) to one terminal (410, 420, 430).

Although the embodiment of the present invention has been described above, the embodiment described above should not be construed as limiting the invention in the appended claims. It should also be noted that not all the combinations of the features described in the above embodiment are essential to the means for solving the problems of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An electrical collecting and distributing member holding structure, comprising:
   a stator including a multiplicity of cores arranged annularly, windings wound around the multiplicity of cores respectively, and an insulator for electrical insulation between the cores and the windings;
   a plurality of annular electrical collecting and distributing members held around the stator to collect and distribute electric current to the windings; and
   a holding portion formed on the insulator, the holding portion including a plurality of recesses formed therein, the plurality of recesses being formed on top of each other in an axial direction of the stator and open in a radial direction of the stator in such a manner so as to receive and hold the plurality of electrical collecting and distributing members in the holding portion when the plurality of annular electrical collecting and distributing members are inserted inwardly in the radial direction of the stator into the plurality of recesses, respectively,
   wherein the electrical collecting and distributing members integrally include a respective U shaped portion, which is formed by bending a metal conductor into a U shape, respective held portions, which are held in the holding portion, and a respective pair of separated extended portions, which are provided between both ends of the respective U shaped portion and the respective held portions, respectively, by extension in a radial direction of the annular electrical collecting and distributing members,
   wherein the electrical collecting and distributing members and the windings are electrically connected together with a respective end of the windings inserted in the respective U shaped portion,
   wherein the U shape portion includes a pair of extended portions extending in a radial direction and a pair of shafts extending in an axial direction as one piece, and a respective end of the windings is inserted between the pair of shafts and the pair of shafts are clamped on both sides into electrically-conductive engagement with the respective end of the winding to electrically connect the respective winding to the electrical collecting and distributing member, the extended portions of the U shaped portion remaining separated from one another.

2. The electrical collecting and distributing member holding structure according to claim 1, wherein the plurality of electrical collecting and distributing members are inserted and held by press fitting into the plurality of recesses, respectively.

3. The electrical collecting and distributing member holding structure according to claim 1, further comprising a locking portion provided on the holding portion to lock the electrical collecting and distributing members to prevent the electrical collecting and distributing members from slipping out of the recesses.

4. The electrical collecting and distributing member holding structure according to claim 1, wherein the electrical collecting and distributing members and the windings are electrically connected together by caulking the respective U shaped portion with the respective end of the windings inserted therein.

5. The electrical collecting and distributing member holding structure according to claim 1, wherein the respective U shaped portion is plated with tin, and the electrical collecting and distributing members and the windings are electrically connected together by heat caulking the respective U shaped portion with the respective end of the windings inserted therein.

6. An electrical collecting and distributing member holding structure, comprising:
   a stator including a multiplicity of cores arranged annularly, windings wound around the multiplicity of cores respectively, and an insulator for electrical insulation between the cores and the windings;
   a plurality of annular electrical collecting and distributing members held around the stator to collect and distribute electric current to the windings; and
   a holding portion formed on the insulator, the holding portion including a plurality of recesses formed therein, the plurality of electrical collecting and distributing members being held in the holding portion in such a manner as to be partially received in the plurality of recesses, respectively,
   wherein the electrical collecting and distributing members integrally include a respective U shaped portion, which is formed by bending a metal conductor into a U shape, respective held portions, which are held in the holding portion, and a respective pair of separated extended portions, which are provided between both ends of the respective U shaped portion and the respective held portions, respectively, by extension in a radial direction of the annular electrical collecting and distributing members,
   wherein the electrical collecting and distributing members and the windings are electrically connected together with a respective end of the windings inserted in the respective U shaped portion,
   wherein the U shape portion includes a pair of extended portions extending in a radial direction and a pair of shafts extending in an axial direction as one piece, and a respective end of the windings is inserted between the pair of shafts and the pair of shafts are clamped on both sides into electrically-conductive engagement with the respective end of the winding to electrically connect the respective winding to the electrical collecting and distributing member, the extended portions of the U shaped portion remaining out of contact with one another.

7. The electrical collecting and distributing member holding structure according to claim 1, wherein a plurality of the holding portions are arranged on the stator and spaced in a circumferential direction of the stator, and the electrical collecting and distributing members are arranged in such a manner that their respective pairs of extended portions project from between pairs of the adjacent holding portions in the circumferential direction of the stator, and in inserting directions of the respective held portions into the recesses of the pairs of the adjacent holding portions, respectively.

8. The electrical collecting and distributing member holding structure according to claim 7, wherein a pitch between the pairs of the adjacent holding portions in the circumferential direction of the stator accommodates a width of the respective pairs of extended portions in circumferential directions of the electrical collecting and distributing members.

9. The electrical collecting and distributing member holding structure according to claim 1, wherein the plurality of electrical collecting and distributing members are in identical shapes.

10. The electrical collecting and distributing member holding structure according to claim 9, wherein at least some of the plurality of windings are bent depending on locations of the plurality of electrical collecting and distributing members, respectively, in an axial direction of the stator.

11. The electrical collecting and distributing member holding structure according to claim 1, wherein the plurality of recesses are being formed side by side in a radial direction of the stator, and are open in an axial direction of the stator.

\* \* \* \* \*